(12) United States Patent
Hamaguchi et al.

(10) Patent No.: US 10,247,088 B2
(45) Date of Patent: Apr. 2, 2019

(54) SADDLE-RIDDEN TYPE VEHICLE AND INTAKE DEVICE FOR ENGINE HAVING SUPERCHARGER

(71) Applicant: SUZUKI MOTOR CORPORATION, Hamamatsu-shi, Shizuoka (JP)

(72) Inventors: Ryohei Hamaguchi, Hamamatsu (JP); Shintaro Yagi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 303 days.

(21) Appl. No.: 15/334,983

(22) Filed: Oct. 26, 2016

(65) Prior Publication Data

US 2017/0114708 A1   Apr. 27, 2017

(30) Foreign Application Priority Data

Oct. 27, 2015   (JP) ................................. 2015-210450
Oct. 27, 2015   (JP) ................................. 2015-210460

(51) Int. Cl.
*B62K 11/04*     (2006.01)
*F02B 29/04*     (2006.01)
(Continued)

(52) U.S. Cl.
CPC .......... *F02B 29/0406* (2013.01); *B62K 11/04* (2013.01); *F02B 37/00* (2013.01); *F02B 61/02* (2013.01); *F02M 35/048* (2013.01); *F02M 35/162* (2013.01); *Y02T 10/144* (2013.01); *Y02T 10/146* (2013.01)

(58) Field of Classification Search
CPC ...... F02B 29/0406; F02B 37/00; F02B 61/02; B62K 11/04; Y02T 10/144; F02M 35/048; F02M 35/162
See application file for complete search history.

(56) References Cited

U.S. PATENT DOCUMENTS 8,857,552 B2    10/2014   Oltmans ........................ 180/219
9,677,518 B2 *   6/2017   Arima ..................... F02B 39/04
(Continued)

FOREIGN PATENT DOCUMENTS

DE   10 2014 113 929 A1   3/2015
DE   10 2014 111 719 A1   4/2015
(Continued)

OTHER PUBLICATIONS

German Office Action dated Feb. 13, 2017, issued by the German Patent and Trademark Office in corresponding application DE 10 2016 012 822.4.

*Primary Examiner* — Joseph M Rocca
*Assistant Examiner* — Marlon A Arce
(74) *Attorney, Agent, or Firm* — Stein IP, LLC

(57) ABSTRACT

There is provided a saddle-ridden type vehicle. A vehicle body frame has a head pipe and a pair of frame members extends rearward from the head pipe with expanding in a vehicle width direction. An engine is supported between the frame members. An air cleaner is configured to purify air for fuel combustion. A supercharger is configured to compress the purified air. An intercooler is configured to cool the compressed air and to supply the compressed air to the engine. The supercharger is disposed in front of the engine. The air cleaner and the intercooler are disposed above the engine and the supercharger.

13 Claims, 27 Drawing Sheets

(51) Int. Cl.
*F02B 37/00* (2006.01)
*F02B 61/02* (2006.01)
*F02M 35/04* (2006.01)
*F02M 35/16* (2006.01)

(56) References Cited

U.S. PATENT DOCUMENTS

| | | | | |
|---|---|---|---|---|
| 2010/0175946 | A1* | 7/2010 | Karube | B60K 5/00 180/291 |
| 2012/0260896 | A1* | 10/2012 | Saeki | F02B 33/40 123/559.1 |
| 2012/0267182 | A1* | 10/2012 | Saeki | B62K 19/30 180/219 |
| 2015/0083513 | A1* | 3/2015 | Ito | B60K 13/02 180/229 |
| 2015/0107923 | A1* | 4/2015 | Inayama | B60K 11/04 180/229 |

FOREIGN PATENT DOCUMENTS

| | | |
|---|---|---|
| EP | 2 075 181 A2 | 12/2008 |
| JP | 2015-83437 A | 4/2015 |

\* cited by examiner

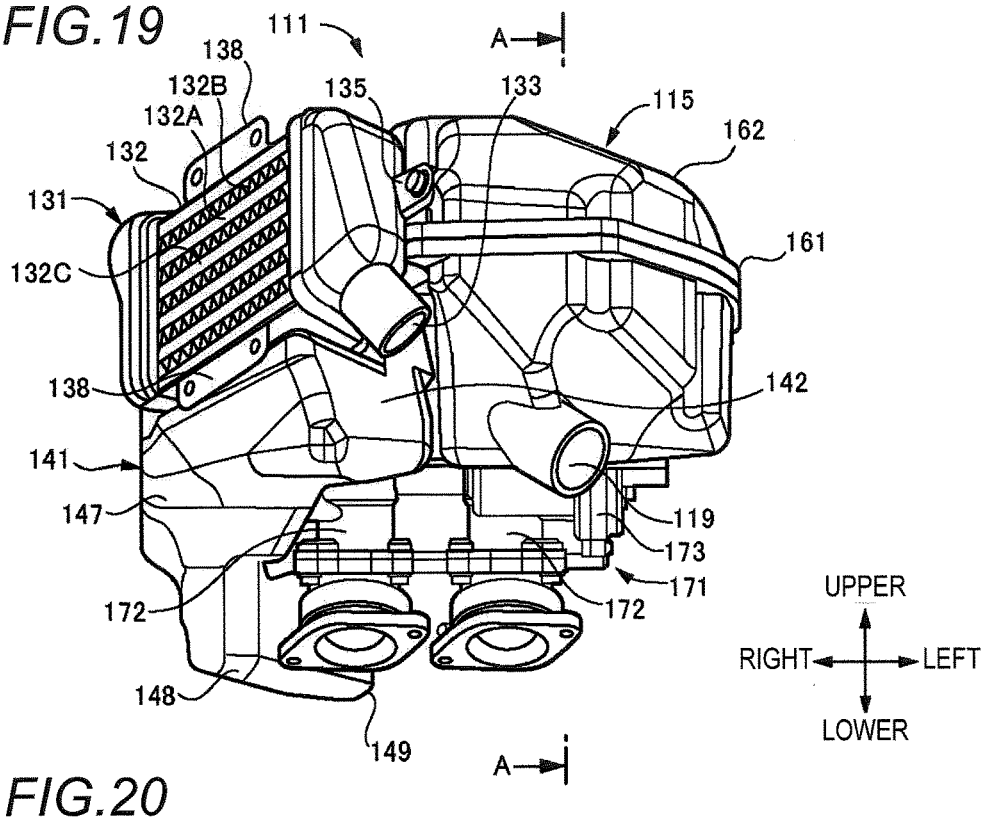

SADDLE-RIDDEN TYPE VEHICLE AND INTAKE DEVICE FOR ENGINE HAVING SUPERCHARGER

CROSS-REFERENCE TO RELATED APPLICATIONS

The disclosure of Japanese Patent Application No. 2015-210450 filed on Oct. 27, 2015 and Japanese Patent Application No. 2015-210460 filed on Oct. 27, 2015, including specification, drawings and claims is incorporated herein by reference in its entirety.

TECHNICAL FIELD

The disclosure relates to a saddle-ridden type vehicle having a supercharger.

The disclosure also relates to an intake device which is to be used for an engine having a supercharger.

BACKGROUND

A saddle-ridden type vehicle such as a motorcycle is provided with a supercharger and air compressed by the supercharger is supplied to a combustion chamber of an engine, so that it is possible to increase a thermal efficiency and an output of the engine. Patent Document 1 discloses a saddle-ridden type vehicle having a supercharger.

The saddle-ridden type vehicle disclosed in Patent Document 1 has an air cleaner configured to purify exterior air, a supercharger configured to compress the air purified by the air cleaner, an intercooler configured to cool the air of which a temperature has increased resulting from the compression by the supercharger, and a surge tank configured to temporarily store therein the air cooled by the intercooler and to supply the same to an engine. Also, in the saddle-ridden type vehicle, the air cleaner and the supercharger are interconnected by an air intake piping. Also, the supercharger and the intercooler are interconnected by an air outlet piping. Also, the intercooler and the surge tank are disposed adjacent to each other and are directly interconnected via a short pipe line.

Patent Document 1: Japanese Patent Application Publication No. 2015-83437A

The saddle-ridden type vehicle configured to compress the air by the supercharger and to supply the same to the engine has more components of an intake system, as compared to natural intake, because the supercharger, the intercooler, the air outlet piping configured to interconnect the same, and the like are provided. Also, in the supercharger (turbocharger) configured to drive a turbine by using an exhaust gas of the engine, it is necessary to smoothly supply the exhaust gas to the turbine of the supercharger. Therefore, it is preferably to dispose the supercharger in the vicinity of an exhaust port provided at a front part of the engine. Due to this, the supercharger is disposed in front of the engine in many cases. On the other hand, since an intake port of the engine is provided at a rear part of the engine, the surge tank configuring a downstream-side of the intake system is disposed at the rear of the engine in many cases. Further, an arrangement place of the air cleaner is limited due to a relation with a layout of a path (a duct and the like) configured to guide the exterior air, which is to be used for combustion of fuel, to the air cleaner. Also, an arrangement place of the intercooler is limited due to a relation with a layout of a path configured to guide the exterior air, which is to be used for cooling of the compressed air, to the intercooler. Due to the situations, in the saddle-ridden type vehicle having the supercharger, it is difficult to determine positions around the engine, at which the plurality of components of the intake system is to be disposed.

In the saddle-ridden type vehicle of Patent Document 1, the air cleaner is disposed at a lower-rear side of the engine, the supercharger is disposed at a lower-front side of the engine, and the intercooler and the surge tank are disposed at the rear of the engine. Since the supercharger and the intercooler are dispersedly disposed at the front and rear of the engine and are distant from each other, the air outlet piping configured to interconnect the supercharger and the intercooler is long. For this reason, a resistance against the air flowing through the air outlet piping is large, so that a response of the engine to a throttle operation may decrease or a turbo lag may increase.

Also, in the saddle-ridden type vehicle of Patent Document 1, since the air intake piping and the air outlet piping configured to interconnect the air cleaner, the supercharger and the intercooler dispersedly disposed at the front and rear of the engine are disposed at a side of the engine, a vehicle width of the saddle-ridden type vehicle may increase.

In the saddle-ridden type vehicle of Patent Document 1, the air cleaner, the intercooler and the surge tank are separate components, the air cleaner is disposed at a lower-rear side of the engine, the intercooler is disposed at the rear of the engine, and the surge tank is disposed above the intercooler. Like this, in the saddle-ridden type vehicle of Patent Document 1, the components of an intake system such as the air cleaner, the intercooler and the surge tank are separate members and are dispersedly disposed around the engine. For this reason, when manufacturing the saddle-ridden type vehicle, the man-hour of mounting the components of the intake system to a vehicle body increases. Also, since mounting positions and directions of the respective components of the intake system are different, a mounting ability of the components is poor.

Also, since the components of the intake system are dispersedly disposed around the engine, the components protrude in a plurality of upper, lower, front, rear, right and left directions. For this reason, it is difficult to make the saddle-ridden type vehicle small. Also, since the components of the intake system are dispersedly disposed around the engine, pipings configured to interconnect the components are also dispersedly disposed around the engine and are lengthened. As a result, it is difficult to reduce a vehicle width of the saddle-ridden type vehicle.

SUMMARY

It is therefore a first object of the disclosure to provide a saddle-ridden type vehicle capable of decreasing a resistance against an air flowing through an intake piping such as an air intake piping, an air outlet piping and the like, thereby increasing a response of an engine or decreasing a turbo lag.

A second object of the disclosure is to provide a saddle-ridden type vehicle capable of compactly disposing components of an intake system, thereby reducing a vehicle width.

A third object of the disclosure is to provide an intake device for an engine having a supercharger and a saddle-ridden type vehicle capable of improving a mounting ability of components of an intake system.

A fourth object of the disclosure is to provide an intake device for an engine having a supercharger and a saddle-ridden type vehicle capable of making a vehicle body small.

According to an aspect of the embodiments of the present invention, there is provided a saddle-ridden type vehicle comprising: a vehicle body frame having a head pipe and a pair of frame members each of which is connected to the head pipe and extends rearward from the head pipe with expanding toward one side and the other side in a vehicle width direction, respectively; an engine supported between the pair of frame members; an air cleaner configured to purify air for fuel combustion; a supercharger configured to compress the air purified by the air cleaner; and an intercooler configured to cool the air compressed by the supercharger and to supply the compressed air to the engine, wherein the supercharger is disposed in front of the engine, and wherein the air cleaner and the intercooler are disposed above the engine and the supercharger.

According to the above aspect of the disclosure, the supercharger is disposed in front of the engine, and the air cleaner and the intercooler are disposed above the engine and the supercharger, so that it is possible to concentrate the air cleaner, the supercharger and the intercooler in a region ranging from the front of the engine to the above thereof. Thereby, both the intake piping (air intake piping) configured to interconnect the air cleaner and the supercharger and the intake piping (air outlet piping) configured to interconnect the supercharger and the intercooler can be configured as linear short pipings configured to extend in an upper-lower direction at the front of the engine. Therefore, it is possible to reduce the resistance against the air flowing through the intake pipings, so that it is possible to increase a response of the engine or to reduce a turbo lag. Also, it is possible to omit an intake piping traversing laterally the engine, so that it is possible to reduce a vehicle width.

In the saddle-ridden type vehicle, the air cleaner and the intercooler may be disposed at positions overlapping with the supercharger, as seen in a plan view of the saddle-ridden type vehicle.

According to the above aspect of the disclosure, it is possible to bring the air cleaner and the supercharger close to each other and to bring the intercooler and the supercharger close to each other. Therefore, the intake piping configured to interconnect the air cleaner and the supercharger and the intake piping configured to interconnect the intercooler and the supercharger can be made short, respectively, so that it is possible to reduce the resistance against the air flowing through the intake pipings.

In the saddle-ridden type vehicle, the air cleaner and the intercooler may be arranged side by side in the vehicle width direction.

According to the above aspect of the disclosure, it is possible to equally shorten a distance between the air cleaner and the supercharger and a distance between the intercooler and the supercharger, so that it is possible to shorten both the intake piping configured to interconnect the air cleaner and the supercharger and the intake piping configured to interconnect the intercooler and the supercharger. Therefore, it is possible to reduce the resistance against the air flowing through the intake pipings. Also, the intake piping configured to interconnect the air cleaner and the supercharger and the intake piping configured to interconnect the intercooler and the supercharger can be piped to extend upward and downward in the substantially same direction and can be brought close to each other. Thereby, it is possible to shorten a bypass piping for flowing the air from one intake piping (air outlet piping) to the other intake piping (air intake piping) so as to escape the downstream air of the supercharger toward the upstream side without the supercharger.

In the saddle-ridden type vehicle, the supercharger may comprise a turbine unit having a turbine configured to drive by an exhaust gas of the engine and a compressor unit configured to drive by power of the turbine and to compress the air, the turbine unit and the compressor unit may be arranged side by side in the vehicle width direction, and the intercooler and the compressor unit may be disposed at opposite sides with respect to the vehicle width direction.

According to the above aspect of the disclosure, it is possible to dispose the intake piping configured to interconnect the air cleaner and an intake port of the compressor unit and the intake piping configured to interconnect a discharge port of the compressor unit and the intercooler so that they extend in parallel, without intersecting the same. Therefore, it is possible to make each of the intake pipings extend in a substantially linear shape, so that it is possible to shorten each of the intake pipings.

The saddle-ridden type vehicle may further comprise a surge tank configured to temporarily store therein the air cooled by the intercooler and to supply the stored air to the engine, and the surge tank may be disposed at the rear of the air cleaner.

According to the above aspect of the disclosure, when the air cleaner and the intercooler are arranged side by side in the vehicle width direction, it is possible to concentrate the air cleaner, the intercooler and the surge tank. Thereby, it is possible to shorten the piping configured to interconnect the intercooler and the surge tank, so that it is possible to increase the response of the engine and to reduce the turbo lag. Also, for example, it is possible to form a case of the air cleaner and the surge tank by a single molded product, and to easily attach the intercooler to the molded product for unitization.

In the saddle-ridden type vehicle according to claim 5, the air cleaner and the surge tank may be disposed adjacent to each other in a front-rear direction of the saddle-ridden type vehicle.

According to the above aspect of the disclosure, it is possible to concentrate the air cleaner and the surge tank, and to easily form the case of the air cleaner and the surge tank by a molded product.

In the saddle-ridden type vehicle, the intercooler may be disposed at one side in the vehicle width direction, the intercooler may have a heat radiation part having fins configured to radiate heat of the air compressed by the supercharger by receiving exterior air, and the intercooler may be disposed so that a receiving surface of the heat radiation part for receiving the exterior air is substantially parallel with one of the pair of frame members, which is positioned at the one side in the vehicle width direction.

According to the above aspect of the disclosure, it is possible to prevent the intercooler from protruding outward beyond the frame member in the vehicle width direction of the saddle-ridden type vehicle, so that it is possible to suppress the vehicle width.

In the saddle-ridden type vehicle, as seen in a plan view of the saddle-ridden type vehicle, the air cleaner and the intercooler may be positioned between an outermost part of one of the pair of frame members, at the one side in the vehicle width direction, and an outermost part of the other of the pair of frame members, at the other side in the vehicle width direction.

According to the above aspect of the disclosure, it is possible to concentrate the air cleaner, the intercooler and the intake piping at a central part in the vehicle width direction of the saddle-ridden type vehicle, so that it is possible to decrease the vehicle width.

According to another aspect of the embodiments of the present invention, there is provided an intake device for an engine having a supercharger, comprising: an air cleaner configured to purify air for fuel combustion; an intercooler configured to cool the air purified by the air cleaner and compressed by the supercharger by cooling air; and a surge tank configured to temporarily store therein the air cooled by the intercooler and to supply the stored air to the engine, wherein the surge tank is coupled to the air cleaner and the intercooler is attached to the air cleaner.

According to the above aspect of the disclosure, the air cleaner, the intercooler and the surge tank form a single unit. Thereby, for example, when manufacturing the saddle-ridden type vehicle, it is possible to complete the mounting of the air cleaner, the intercooler and the surge tank to a vehicle body simply by mounting the single unit formed in advance by the air cleaner, the intercooler and the surge tank to the vehicle body of the saddle-ridden type vehicle. Also, the air cleaner, the intercooler and the surge tank are formed as the single unit, so that it is possible to concentrate the corresponding components in a compact manner.

In the intake device, the surge tank may be coupled to a rear part of the air cleaner and the intercooler is attached to a side of the air cleaner.

According to the above aspect of the disclosure, for example, when the unit formed by the air cleaner, the intercooler and the surge tank is attached to the vehicle body above the engine, it is possible to bring the supercharger and the air cleaner disposed in front of the engine close to each other and to bring the supercharger and the intercooler close to each other. Therefore, it is possible to shorten a piping configured to interconnect the supercharger and the air cleaner and a piping configured to interconnect the supercharger and the intercooler and to concentrate the pipings in front of the engine. In the meantime, it is possible to bring the surge tank close to an intake port provided at the rear part of the engine, so that it is possible to shorten an intake passage between the surge tank and the intake port.

The intake device may further comprise a unit case in which a case of the air cleaner and an outer shell of the surge tank are integrally formed.

According to the above aspect of the disclosure, it is possible to simply manufacture the air cleaner and the surge tank and to save the manufacturing cost of the corresponding components.

The intake device may further comprise an air discharging duct configured to determine a discharge position or a discharge direction of the cooling air discharged from the intercooler, the air discharging duct may be disposed between the air cleaner and the intercooler.

According to the above aspect of the disclosure, it is possible to form a single unit by integrating the air cleaner, the intercooler, the surge tank and the air discharging duct.

The intake device may further comprise a unit case in which a case of the air cleaner and an outer shell of the surge tank are integrally formed, the unit case may have a case main body part configured to form a lower part of the unit case and a case cover part configured to form an upper part of the unit case, the case main body part and the case cover part may be formed by separate members, the air discharging duct may have an air discharging introduction part configured to introduce the cooling air discharged from the intercooler and an air discharging guide part configured to guide the cooling air introduced by the air discharging introduction part in a predetermined direction, the air discharging introduction part and the air discharging guide part may be formed by separate members, the air discharging introduction part may have a lower part configured to form a lower part of the air discharging introduction part and an upper part configured to form an upper part of the air discharging introduction part, and the lower part and the upper part may be formed by separate members.

According to the above aspect of the disclosure, it is possible to assemble the unit configured by the air cleaner, the intercooler, the surge tank and the air discharging introduction part, in accordance with a following simple sequence. That is, first, the lower part of the air discharging introduction part is fixed to the case main body part of the unit case, and the upper part of the air discharging introduction part is fixed to the case cover part of the unit case. Then, the case cover part having the upper part fixed thereto is attached to the case main body part having the lower part fixed thereto. Also, the unit assembled in corresponding order is mounted to the vehicle body and the air discharging guide part is attached to the unit. Thereby, it is possible to simply mount the air discharging duct to the vehicle body.

There may be provided a saddle-ridden type vehicle having the above described intake device.

According to the above aspect of the disclosure, it is possible to simply mount the air cleaner, the intercooler and the surge tank to the vehicle body. Also, it is possible to concentrate the air cleaner, the intercooler and the surge tank.

According to the disclosure, it is possible to reduce the resistance against the air flowing through the intake pipings such as the air intake piping, the air outlet piping and the like, so that it is possible to increase the response of the engine or to reduce the turbo lag. Also, it is possible to compactly dispose the components of the intake system, thereby reducing the vehicle width.

According to the disclosure, it is possible to improve the mounting ability of the components of the intake system such as the air cleaner, the intercooler, the surge tank and the like. Also, it is possible to easily implement the miniaturization of the vehicle body.

BRIEF DESCRIPTION OF THE DRAWINGS

In the accompanying drawings:

FIG. 19 is a front view of the intake unit, which is the second illustrative embodiment of the intake device for an engine having a supercharger of the disclosure, and the like;

FIG. 20 is a left side view of the intake unit and the like in FIG. 19;

DETAILED DESCRIPTION OF THE EMBODIMENTS

First Illustrative Embodiment

Hereinafter, a first illustrative embodiment according to the disclosure will be described with reference to FIGS. 1 to 11.

(Motorcycle Having Supercharger)

Figure 1:
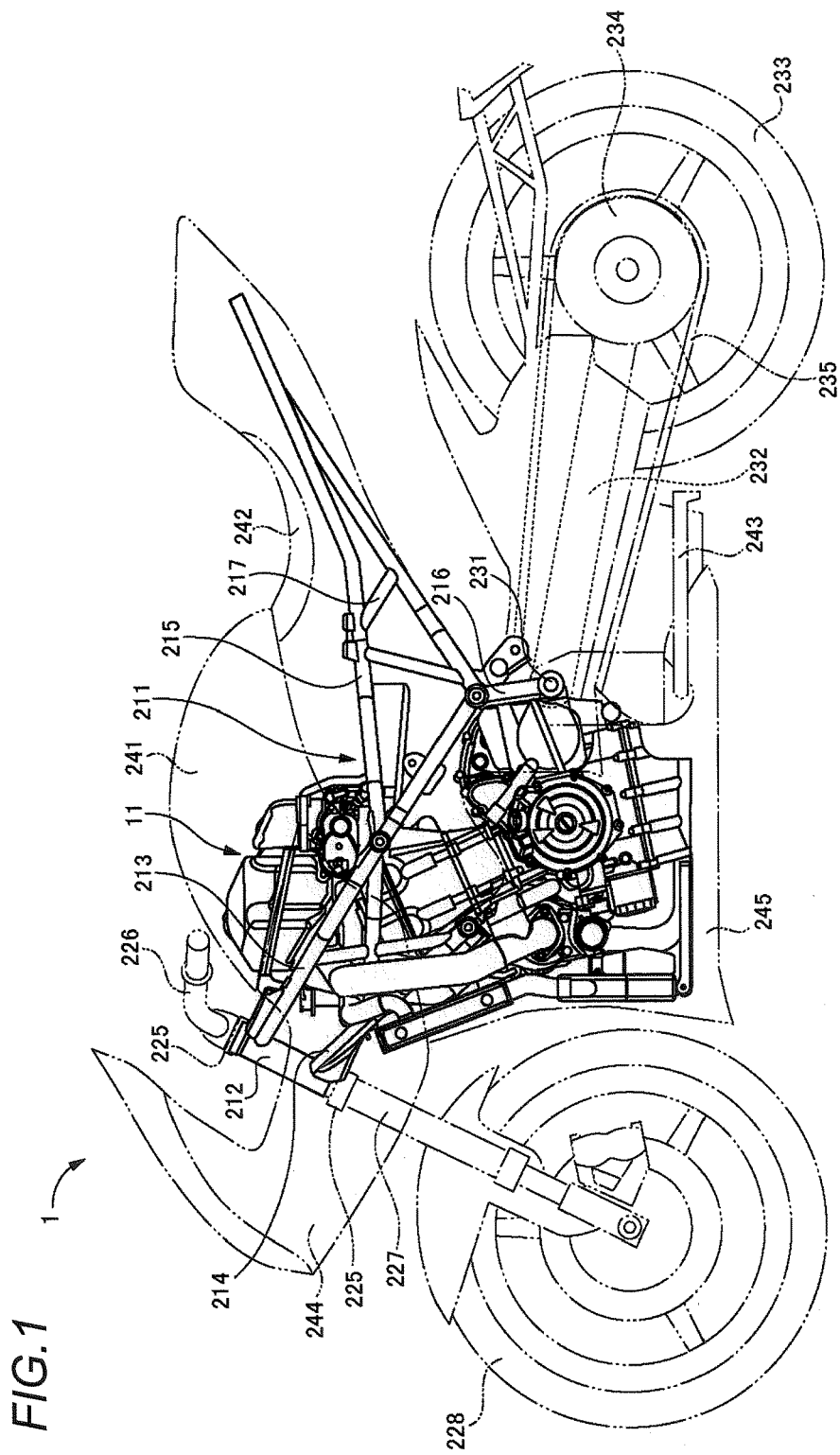
FIG. 1 illustrates a motorcycle having a supercharger, which is a first illustrative embodiment of the saddle-ridden type vehicle of the disclosure.
Figure 2:
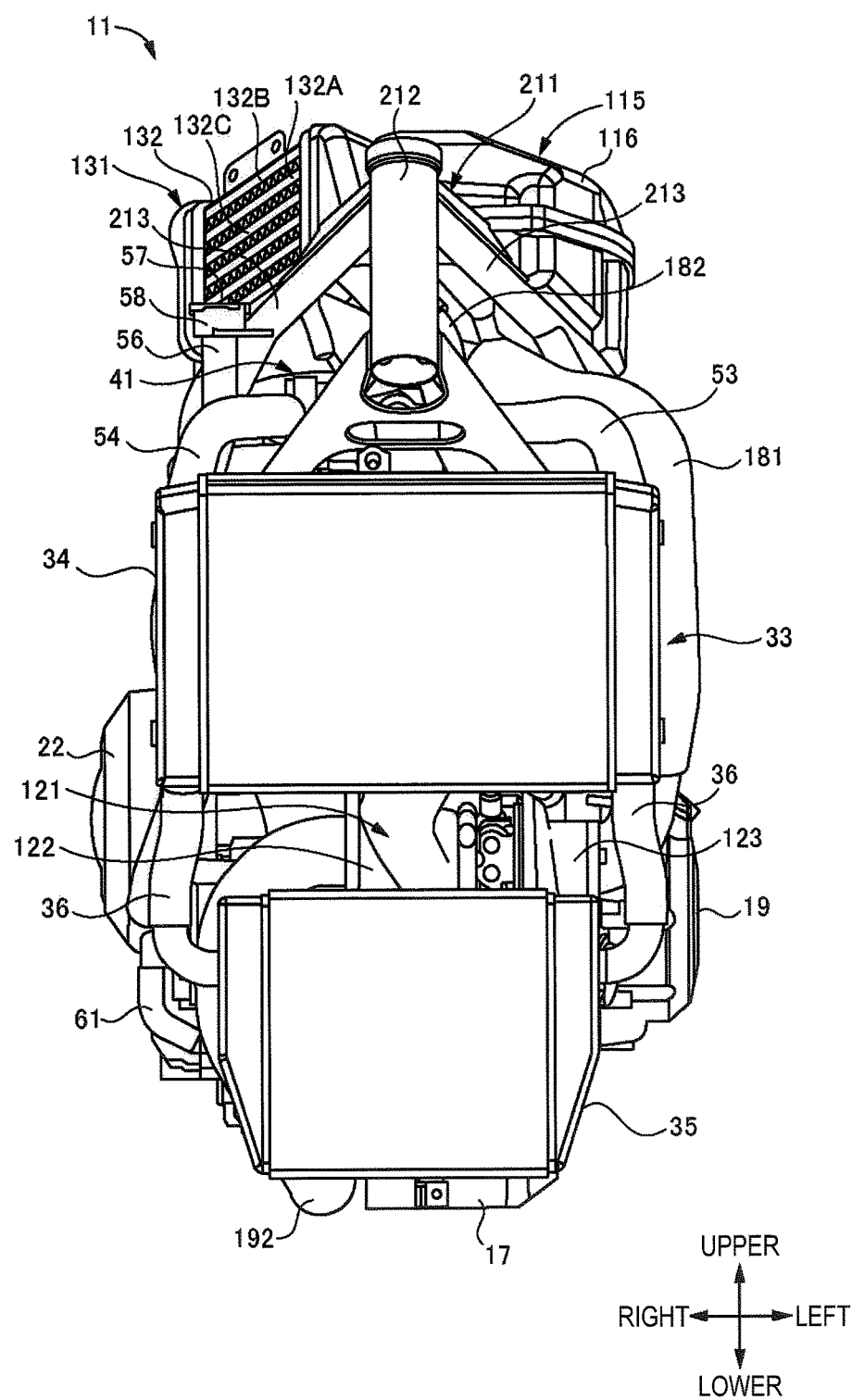
FIG. 2 is a front view of a vehicle body frame and an engine unit of the motorcycle having a supercharger, which is the first illustrative embodiment of the saddle-ridden type vehicle of the disclosure.
Figure 6:
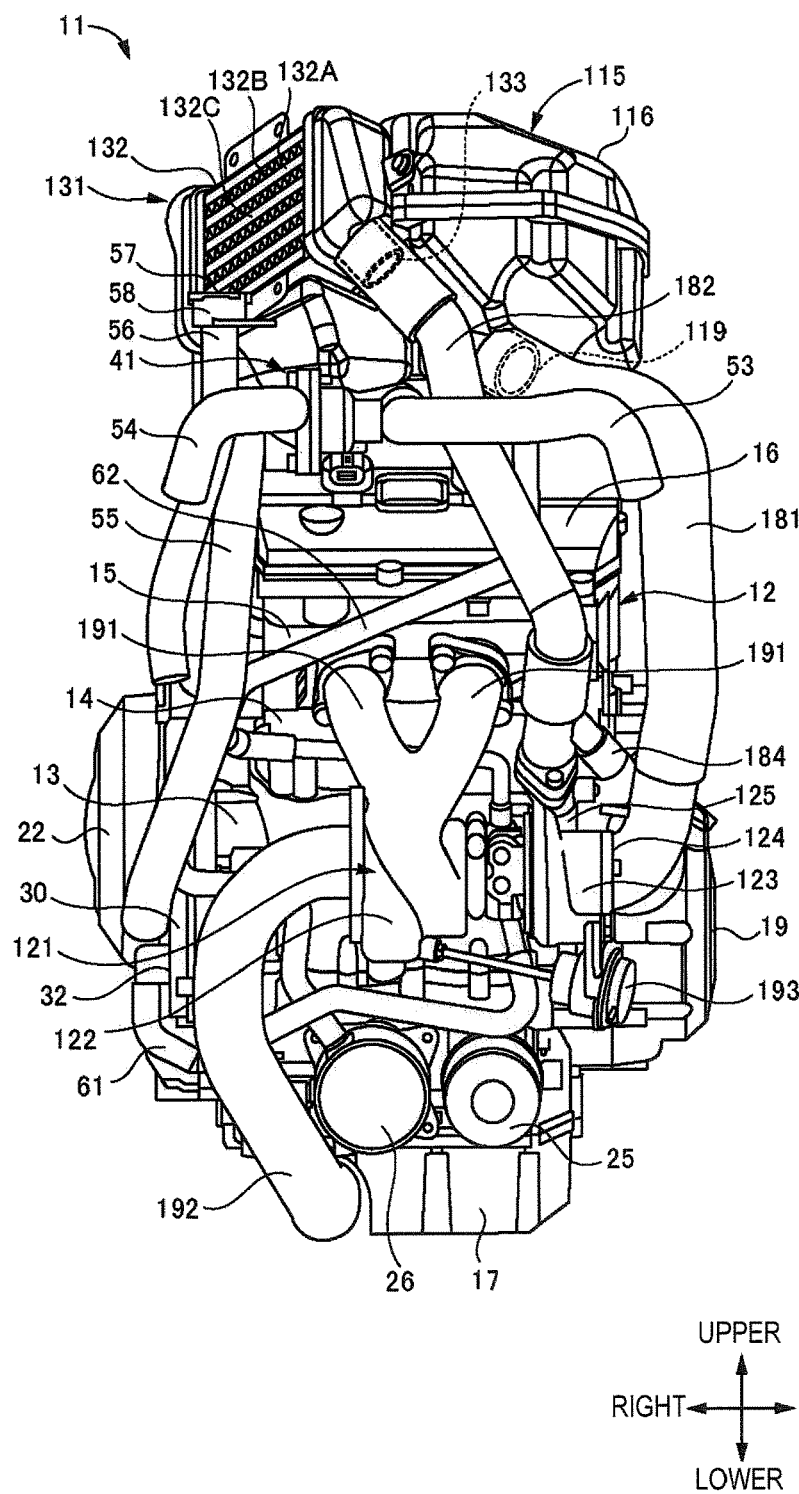
FIG. 6 is a front view depicting a state where a radiator has been removed from the engine unit shown in FIG. 2.
Figure 7:
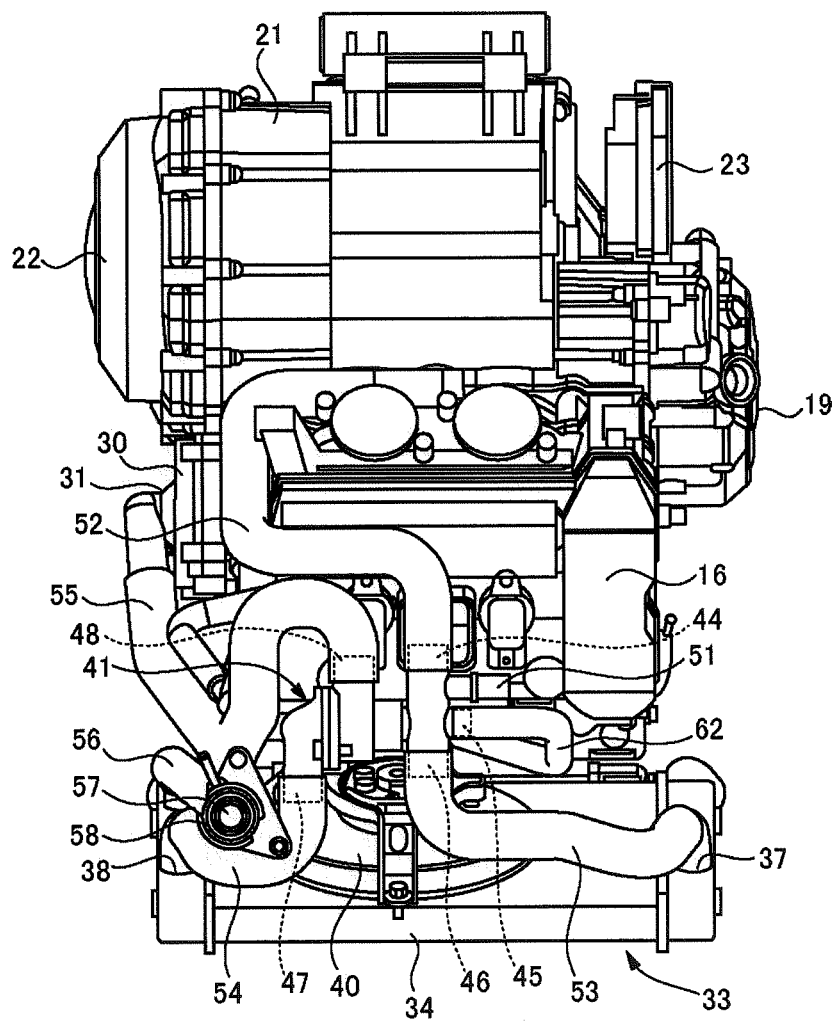
FIG. 7 is a plan view depicting a state where an air cleaner, an intercooler, an air discharging duct, a surge tank and the like have been removed from the engine unit shown in FIG. 5.

FIG. 1 illustrates a motorcycle having a supercharger, which is the first illustrative embodiment of the saddle-ridden type vehicle of the disclosure. In FIG. 1, parts except for a vehicle body frame 211 and an engine unit 11 of the motorcycle having the supercharger are shown with a dashed-two dotted line for convenience of explanations. Also, FIGS. 2 to 5 are a front view, a left side view, a right side view and a plan view of the vehicle body frame 211 and the engine unit 11, and FIG. 6 is a front view depicting a state where a radiator 33 has been removed from the engine unit 11. Also, FIG. 7 is a plan view depicting a state where an air cleaner 115, an intercooler 131 and a surge tank 154 have been removed from the engine unit 11. Also, in below descriptions of the first illustrative embodiment, front, rear, right, left, upper and lower directions are described on the basis of a driver who sits on a seat of the motorcycle having the supercharger.

In FIG. 1, a vehicle body frame 211 of a motorcycle 1 having a supercharger, which is the first illustrative embodiment of the saddle-ridden type vehicle of the disclosure, is formed by joining a plurality of steel pipes, for example. Specifically, the vehicle body frame 211 has a head pipe 212 disposed at a front-upper side of the motorcycle 1, a pair of main frames 213 each of which is disposed at right and left sides of the motorcycle 1, respectively, and has a front end portion connected to an upper part of the head pipe 212 and a rear end-side extending rearward with being inclined downward, a pair of down tubes 214 each of which is disposed at the right and left sides of the motorcycle 1, respectively, and has a front end portion connected to a lower part of the head pipe 212 and a rear end-side extending rearward with being inclined downward beyond the main frame 213, a pair of side frames 215 each of which is disposed at the right and left sides of the motorcycle 1, respectively, and has a front end portion connected to an intermediate part of the down tube 214 and a rear end-side extending rearward, and a pair of pivot frames 216 joined to the rear end-sides of the main frames 213. Also, a reinforcement frame 217 is provided among the main frame 213, the down tube 214 and the side frame 215. In the meantime, the main frame 213 is a specific example of the frame member.

Figure 3:
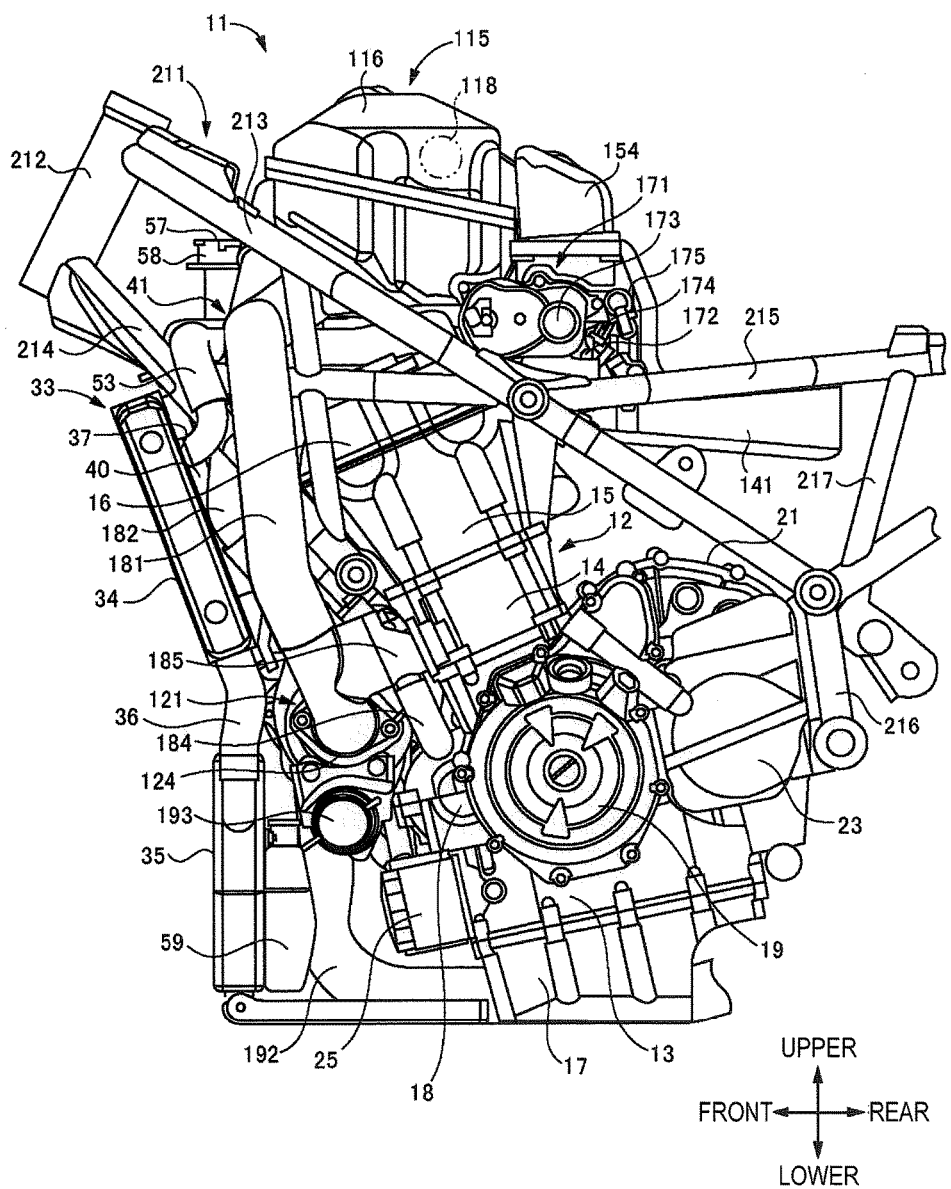
FIG. 3 is a left side view of the vehicle body frame and the engine unit shown in FIG. 2.
Figure 5:
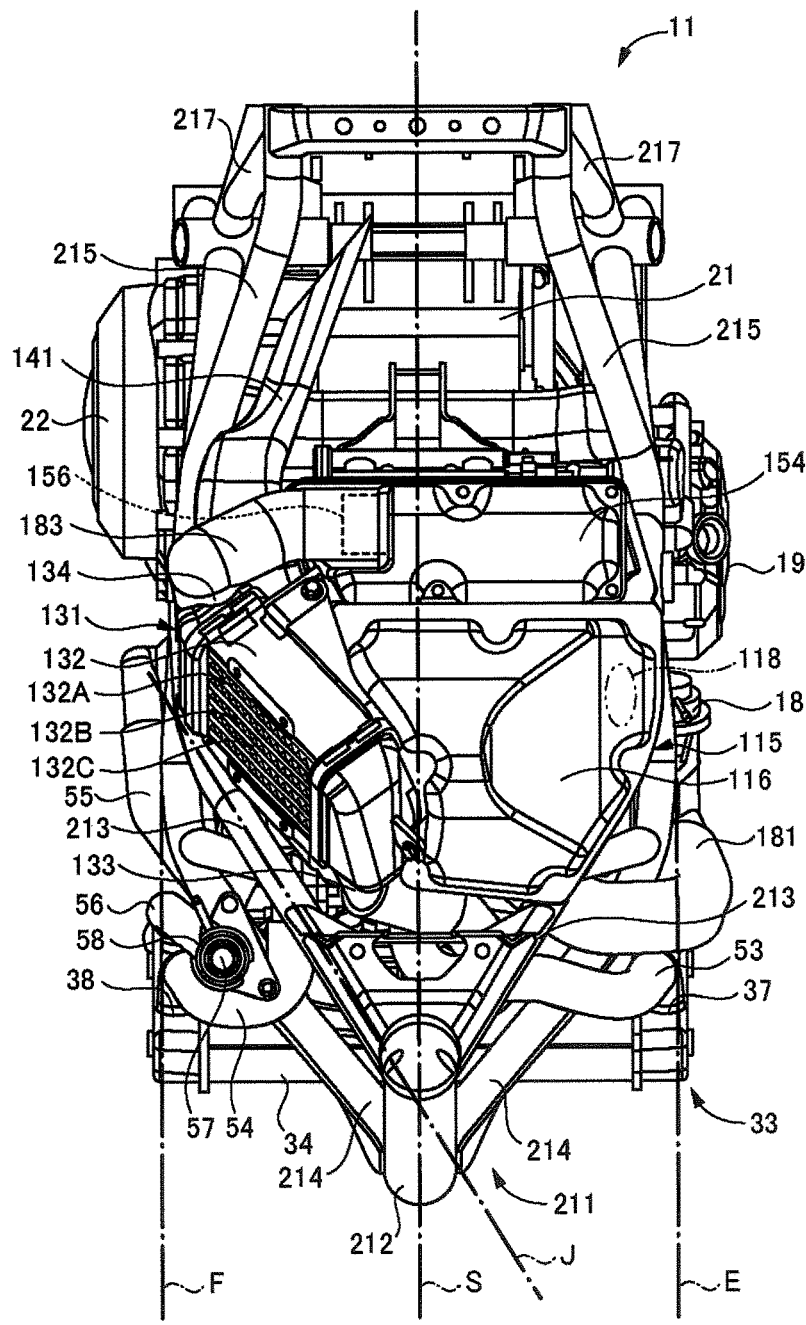
FIG. 5 is a plan view of the vehicle body frame and the engine unit shown in FIG. 2.

Also, as shown in FIG. 5, the pair of main frames 213 extends rearward with expanding leftward and rightward from the head pipe 212, respectively. That is, when a line passing a center of the motorcycle 1 in a right-left direction (vehicle width direction) of the motorcycle 1 in a front-rear direction of the motorcycle 1 is denoted as a reference line S, a front end portion of the right main frame 213 obliquely extends toward a right-rear side from the head pipe 212 disposed at a center of the motorcycle 1 in the right-left direction of the motorcycle 1. Then, the right main frame 213 is gently bent in the vicinity of a rear-right side of a cylinder head 15 of an engine 12 and extends rearward in parallel with the reference line S. Then, the right main frame 213 is slightly bent at a part beyond a rear surface of the cylinder head 15, and extends rearward with being slightly inclined leftward so as to gradually come close to the reference line S. In the meantime, the left main frame 213 has a substantially bilaterally symmetric shape to the right main frame 213 with respect to the reference line S. Also, the pair of down tubes 214 extends rearward with expanding leftward and rightward from the head pipe 212, respectively, like the pair of main frames 213. Also, as shown in FIG. 3, the pair of down tubes 214 is positioned below the pair of main frames 213, a space is formed between the left main frame 213 and the left down tube 214, and a space is formed between the right main frame 213 and the right down tube 214.

Also, as shown in FIG. 1, a steering shaft (not shown) is inserted into the head pipe 212, and upper and lower end portions of the steering shaft are respectively provided with steering brackets 225. Also, the upper steering bracket 225 is provided with a handlebar 226. A pair of right and left front forks 227 is supported at upper parts thereof to the upper and lower steering brackets 225, and a front wheel 228 is supported to lower ends of the front forks 227.

Also, a front end-side of a swing arm 232 is supported between the pair of right and left pivot frames 216 via a pivot shaft 231, and a rear wheel 233 is supported to a rear end-side of the swing arm 232. Also, an axle of the rear wheel 233 is provided with a driven sprocket 234, and a chain 235 configured to transmit power of the engine 12 (which will be described later) is wound on the driven sprocket 234.

Also, the engine unit 11 is provided between the front wheel 228 and the rear wheel 233 of the motorcycle 1. The engine unit 11 is mainly disposed between the left main frame 213 and left down tube 214 and the right main frame 213 and right down tube 214 and is supported to the corresponding frames. Also, a fuel tank 241 is provided above the engine unit 11, and a seat 242 is provided at the rear of the fuel tank 241. Also, a side stand 243 is provided at the left side of the motorcycle 1 and at a lower-rear part of the engine unit 11. Also, an upper cowl 244 is provided at a front-upper side of the motorcycle 1. Also, the motorcycle 1 is provided with an under cowl 245 configured to mainly cover a front-lower side of the engine unit 11.

(Engine Unit)

As shown in FIG. 3, the engine unit 11 has the engine 12, parts of a driving system configured to transmit power of the engine 12 to the rear wheel 233, such as a primary deceleration mechanism, a clutch, a transmission and the like, a lubrication system configured to lubricate a moveable part of the engine 12, an intake system (including a supercharger 113) configured to supply a fuel-air mixture of air and fuel to the engine 12, parts of an exhaust system configured to discharge an exhaust gas, which is to be generated as the fuel-air mixture is combusted, from the engine 12, a cooling system configured to cool the engine 12 and the like, an AC generator configured to generate power by using rotation of a crankshaft, and the like.

In the first illustrative embodiment, the engine 12 is a water-cooling type parallel two-cylinder four-cycle gasoline engine, for example. The engine 12 has a crank case 13 configured to accommodate therein a crankshaft, a cylinder 14 provided above the crank case 13, a cylinder head 15 provided above the cylinder 14 and a cylinder head cover 16 provided above the cylinder head 15. Also, an oil pan 17 is provided below the crank case 13. A cylinder axis of the engine 12 is inclined so that an upper side is located at a forward position relative to a lower side. The engine 12 is provided with a balance shaft configured to reduce vibrations, which are to be generated by movement of a piston. The balance shaft is disposed in front of the crankshaft. Specifically, a balancer chamber 18 is integrally formed at a front part of the crank case 13 of the engine 12. The balancer chamber 18 is formed by expanding forward a part of the crank case 13. A front part of the balancer chamber 18 protrudes forward from a front wall part of the crank case 13. The balance shaft is provided in the balancer chamber 18. Also, a left part of the crank case 13 is provided with a magneto chamber 19, and the AC generator is accommodated in the magneto chamber 19.

Figure 4:
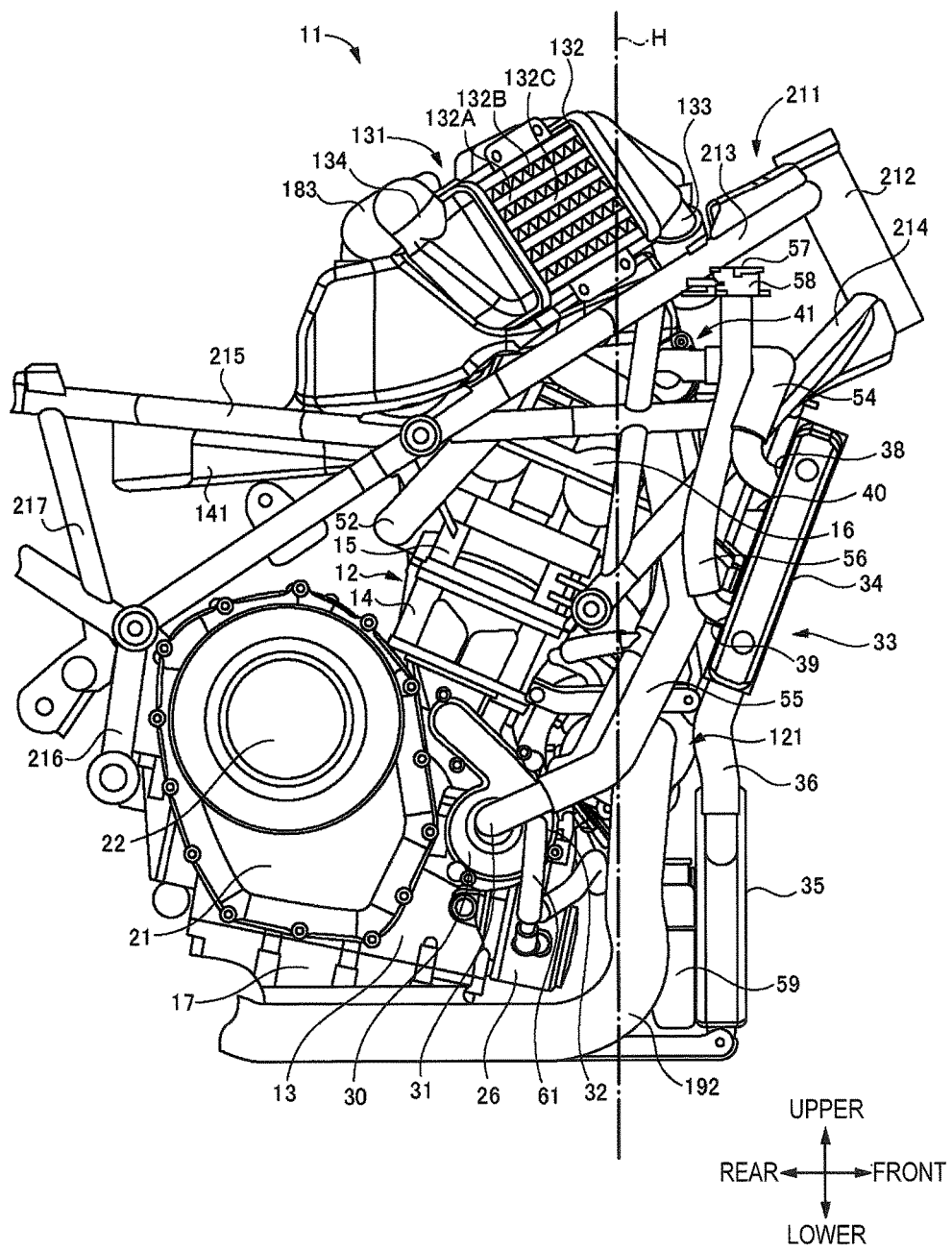
FIG. 4 is a right side view of the vehicle body frame and the engine unit shown in FIG. 2.

Also, as shown in FIG. 4, parts of the driving system such as the primary deceleration mechanism, the clutch, the transmission and the like are disposed at the rear part of the engine unit 11. That is, a transmission case 21 is integrally formed at rear sides of the crank case 13 and the cylinder 14, and the primary deceleration mechanism and the transmission are accommodated in the transmission case 21. Also, a clutch cover 22 is attached to a right part of the transmission case 21, and the clutch disposed at the right of the transmission is covered by the clutch cover 22. Also, as shown in FIG. 3, a sprocket cover 23 is provided at a left part of the transmission case 21, and a drive sprocket disposed at a left side of the transmission is covered by the sprocket cover 23. Also, the drive sprocket is wound with a chain 235 configured to transmit the power of the engine 12 to the rear wheel 233, as shown in FIG. 1.

Also, as shown in FIG. 6, the lubrication system has an oil pump configured to pump engine oil stored in the oil pan 17 of the engine 12 and to supply the same to the respective parts of the engine 12, an oil filter 25 configured to filter the engine oil and a water-cooling type oil cooler 26 configured to cool the engine oil. The oil filter 25 and the oil cooler 26 are attached to a front-lower side of the engine 12.

Also, as shown in FIG. 4 or 7, the cooling system has a water pump 30, a water jacket (not shown), a radiator 33 and a cooling water flow control unit 41. The water pump 30 is a device configured to operate by using the rotation of the crankshaft and to discharge the cooling water to the water jacket. The water jacket is a mechanism provided in the cylinder 14 and the cylinder head 15 and configured to cool the cylinder 14 and the cylinder head 15 by the cooling water.

The radiator 33 is a device configured to receive traveling wind or to drive a radiator fan 40, thereby radiating heat of the cooling water to the atmosphere to cool the cooling water. The radiator 33 is disposed at the front of the engine 12. Also, the radiator 33 has an upper radiator 34 and a lower radiator 35. The upper radiator 34 and the lower radiator 35 are interconnected via a pair of connecting hoses 36. Also, as shown in FIG. 7, the radiator fan 40 is attached at a position toward the right of a rear surface of the upper radiator 34.

Figure 8:
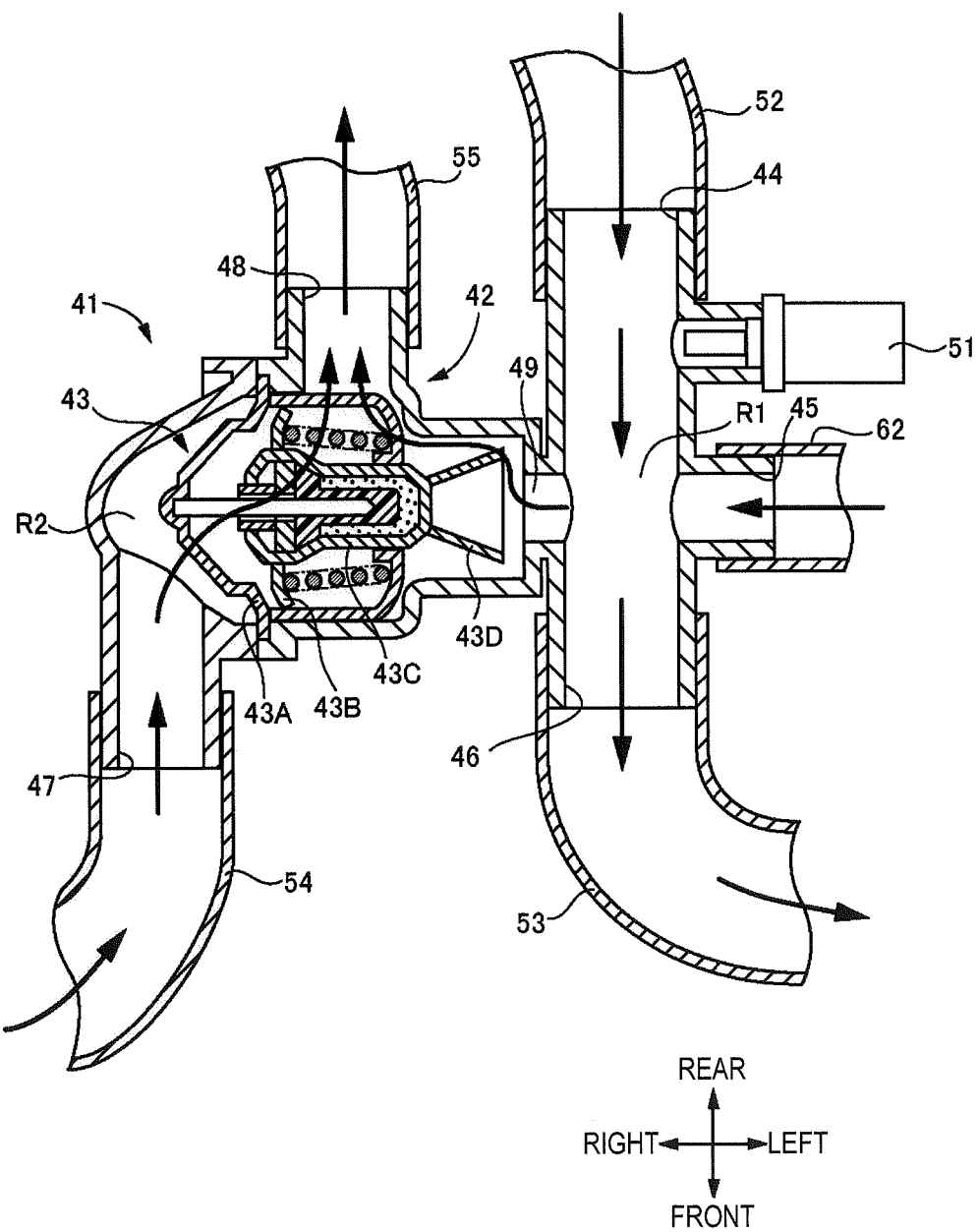
FIG. 8 illustrates an inside of a cooling water flow control unit of the motorcycle having a supercharger, which is the first illustrative embodiment of the saddle-ridden type vehicle of the disclosure.

The cooling water flow control unit 41 is a device configured to regulate an amount of the cooling water to flowing in the radiator 33 in accordance with a temperature of the cooling water and to maintain the temperature of the cooling water to an appropriate temperature. FIG. 8 depicts an inside of the cooling water flow control unit 41. As shown in FIG. 8, the cooling water flow control unit 41 has a thermostat housing 42 and a thermostat 43. Also, a left chamber R1 is formed in a left part of the thermostat housing 42, and a right chamber R2 is formed in a right part thereof. Also, a left-rear side of the thermostat housing 42 is formed with a first cooling water inlet 44 for introducing the cooling water from the water jacket into the left chamber R1. Also, a left side of a left part of the thermostat housing 42 is formed with a second cooling water inlet 45 for introducing the cooling water having cooled the oil cooler 26 and the supercharger 121 into the left chamber R1. Also, the left-front side of the thermostat housing 42 is formed with a cooling water delivery port 46 for delivering the cooling water introduced into the left chamber R1 to the radiator 33. Also, a right-front side of the thermostat housing 42 is formed with a cooling water return port 47 for introducing the cooling water having flowed in the radiator 33 into the right chamber R2. Also, a right-rear side of the thermostat housing 42 is formed with a cooling water outlet 48 for returning the cooling water introduced in the right chamber R2 to the water pump 30. Also, the thermostat housing 42 is formed therein with a cooling water bypass passage 49 configured to supply the cooling water from the left chamber R1 to the right chamber R2 without flowing the same in the radiator 33. Also, the right chamber R2 is provided with the thermostat 43. Also, a water temperature sensor 51 configured to detect the temperature of the cooling water flowing in the left chamber R1 is attached to the left part of the thermostat housing 42.

The thermostat 43 is configured to control opening and closing of a flow path between the cooling water return port 47 and the cooling water outlet 48 and opening and closing of a flow path between the cooling water bypass passage 49 and the cooling water outlet 48, in accordance with the temperature of the cooling water introduced into the right chamber R2. Specifically, when the temperature of the cooling water introduced into the right chamber R2 is equal to or lower than a predetermined reference temperature T1, the thermostat 43 completely closes the flow path between the cooling water return port 47 and the cooling water outlet 48 and completely opens the flow path between the cooling water bypass passage 49 and the cooling water outlet 48. In this case, the cooling water introduced into the left chamber R1 from the first cooling water inlet 44 or the second cooling water inlet 45 flows in the cooling water bypass passage 49 and the right chamber R2 without flowing in the radiator 33 and returns from the cooling water outlet 48 to the water pump 30.

Also, when the temperature of the cooling water introduced into the right chamber R2 is higher than the reference temperature T1 and is equal to or lower than a predetermined reference temperature T2 (T2>T1), the thermostat 43 opens both the flow path between the cooling water return port 47 and the cooling water outlet 48 and the flow path between the cooling water bypass passage 49 and the cooling water outlet 48, increases an area of the flow path between the cooling water return port 47 and the cooling water outlet 48 and reduces an area of the flow path between the cooling water bypass passage 49 and the cooling water outlet 48 as the temperature of the cooling water introduced into the right chamber R2 increases. In this case, the cooling water introduced into the left chamber R1 from the first cooling water inlet 44 or the second cooling water inlet 45 is split in the left chamber R1, which respectively flows in the radiator 33 and the cooling water bypass passage 49, converges in the right chamber R2 and returns from the cooling water outlet 48 to the water pump 30. Also, in this case, as the temperature of the cooling water increases, an amount of the cooling water flowing in the radiator 33 relative to an amount of the cooling water flowing in the cooling water bypass passage 49 increases.

Also, when the temperature of the cooling water introduced into the right chamber R2 is higher than the reference temperature T2, the thermostat 43 completely opens the flow path between the cooling water return port 47 and the cooling water outlet 48, and completely closes the flow path between the cooling water bypass passage 49 and the cooling water outlet 48. In this case, the cooling water introduced into the left chamber R1 from the first cooling water inlet 44 or the second cooling water inlet 45 flows in the cooling water delivery port 46, the radiator 33, the cooling water return port 47 and the right chamber R2 without flowing in the cooling water bypass passage 49 and returns from the cooling water outlet 48 to the water pump 30.

Herein, the thermostat 43 has a valve seat 43A, a main valve body 43B and a thermoelement 43C configured to move the main valve body 43B and to enable the main valve body 43B to be separated from or to be seated on the valve seat 43A in accordance with the temperature of the cooling water. Further, the thermostat 43 is provided with a sub-valve body 43D configured to move together with the main valve body 43B. The sub-valve body 43D is configured to be separated from or to be seated on a part at which the cooling water bypass passage 49 opens toward the right chamber R2. The thermoelement 43C is configured to move the main valve body 43B and the sub-valve body 43D in accordance with the temperature of the cooling water introduced into the right chamber R2. The main valve body 43B is configured to open and close the flow path between the cooling water return port 47 and the cooling water outlet 48, and the sub-valve body 43D is configured to open and close the flow path between the cooling water bypass passage 49 and the cooling water outlet 48.

The respective parts configuring the cooling system are disposed and connected as follows. That is, as shown in FIG. 4, the water pump 30 is attached to the right side of the crank case 13. Also, the water pump 30 is disposed at a position corresponding to the balance shaft positioned in front of the crankshaft. Also, a path (not shown) along which the cooling water is to be supplied from the water pump 30 to the water jacket is formed between the water pump 30 and the water jacket. Also, the cooling water flow control unit 41 is disposed above the cylinder head cover 16, specifically, at a right-front side above the cylinder head cover 16. Also, as shown in FIG. 7, the outlet-side of the water jacket and the first cooling water inlet 44 of the cooling water flow control unit 41 are interconnected by a cylinder outlet hose 52. Also, the cooling water delivery port 46 of the cooling water flow control unit 41 and the radiator inlet 37 of the upper radiator 34 are interconnected by a radiator inlet hose 53. Also, the radiator outlet 38 of the upper radiator 34 and the cooling water return port 47 of the cooling water flow control unit 41 are interconnected by a radiator outlet hose 54. Also, the cooling water outlet 48 of the cooling water flow control unit 41 and the cooling water intake port 31 of the water pump 30 are interconnected by a water pump inlet hose 55. The radiator inlet hose 53, the radiator outlet hose 54 and the water pump inlet hose 55 are concentrated in a space between the engine 12 and the radiator 33. Also, the cylinder outlet hose 52, the radiator outlet hose 54 and the water pump inlet hose 55 are concentrated in a right region around the engine 12.

Also, as shown in FIG. 4, a right-lower side of the rear surface of the upper radiator 34 is formed with a cooling water supply port 39, the cooling water supply port 39 is connected with a lower end portion of a water injection hose 56 extending in the upper-lower direction, and an upper end portion of the water injection hose 56 is provided with a cooling water injection part 58 having a cooling water injection port 57. Also, a reservoir tank 59 configured to reserve therein the cooling water is provided at the rear of the lower radiator 35, and the reservoir tank 59 is connected to the upper radiator 34 via an overflow pipe line (not shown), for example.

Also, the cooling system of the engine unit 11 has a configuration of supplying the cooling water to the oil cooler 26 and the supercharger 113 so as to cool the engine oil and the supercharger 121. Specifically, the water pump 30 has a cooling water discharge port 32 and is configured to supply the cooling water to the water jacket and to discharge the cooling water from the cooling water discharge port 32. The cooling water discharged from the cooling water discharge port 32 is supplied to the oil cooler 26 and the supercharger 121 via an inlet branch piping 61 disposed in front of the engine 12. Also, as shown in FIG. 6 or 7, the cooling water having cooled the engine oil and the supercharger 121 is introduced into the second cooling water inlet 45 of the cooling water flow control unit 41 via an outlet branch piping 62 disposed in front of the engine 12, and converges with the cooling water introduced into the cooling water flow control unit 41 from the water jacket.

(Structures of Intake System and Exhaust System)

Also, as shown in FIG. 3 or 6, the intake system has an air cleaner 115, a supercharger 121, an intercooler 131, an air discharging duct 141, a surge tank 154, an electronic control throttle device 171 and an injector 174.

The air cleaner 115 is a device configured to filter and purify air for fuel combustion introduced from an outside. The air cleaner 115 has a cleaner case 116 and an air filter is provided in the cleaner case 116. Also, the cleaner case 116 is formed with an air intake port 118 configured to introduce the exterior air into the cleaner case 116. Meanwhile, in FIG. 3 or 5, the air intake port 118 is pictorially shown with a dashed-two dotted line. A position of the air intake port 118 can be appropriately set. Also, the air intake port 118 is provided with an air duct (not shown) configured to guide the exterior air into the air intake port 118. Also, as shown in FIG. 6, a front part of the air cleaner 115 is formed with an air outlet 119 for enabling the filtered air to flow from the cleaner case 116.

The supercharger 121 is a supercharger of an exhaust turbine type, and has a turbine unit 122 having a turbine, and a compressor unit 123. The supercharger 121 is configured to drive the turbine of the turbine unit 122 by the exhaust gas from the engine 12, to drive the compressor unit 123 by power of the turbine and to compress the air supplied through the air cleaner 115 by the compressor unit 123. By adopting the supercharger 121, it is possible to increase the thermal efficiency and output of the engine 12, to reduce a displacement of the engine 12 and to make the engine small, as compared to the natural intake.

The intercooler 131 is a heat exchanger configured to cool the air of which temperature has increased resulting from the compression by the compressor unit 123 of the supercharger 121. The intercooler 131 is an air-cooling type, and has a passage 132A for flowing the air compressed by the compressor unit 123 and a heat radiation part 132 having fins 132B configured to receive the exterior air and to radiate the heat of the air compressed by the compressor unit 123, as shown in FIG. 6. Also, the heat radiation part 132 has a receiving surface 132C configured to receive the exterior air for heat radiation. Also, a front part of the intercooler 131 is formed with an air inlet 133 for introducing the air supplied from the compressor unit 123 of the supercharger 121 into the passage 132A of the heat radiation part 132. Also, as shown in FIG. 4 or 5, a rear part of the intercooler 131 is formed with an air outlet 134 for supplying the air to the surge tank 154, which has flowed in the passage 132A of the heat radiation part 132 and has been thus cooled.

Also, an air guide duct (not shown) configured to guide the exterior air to the heat radiation part 132 of the intercooler 131 as a cooling air is provided in front of the intercooler 131. Also, as shown in FIG. 5, the air discharging duct 141 configured to discharge the exterior air, which has been guided by the air guide duct, has collided with the heat radiation part 132 of the intercooler 131 and has passed between the fins 132B of the heat radiation part 132, to the outside is provided at the rear of the intercooler 131.

The surge tank 154 is a device configured to rectify the flow of the air compressed by the supercharger 121 and cooled by the intercooler 131. The surge tank 154 has a space for temporarily storing the air cooled by the intercooler 131. Also, in the first illustrative embodiment, the surge tank 154 is formed integrally with the cleaner case 116 of the air cleaner 115. Also, as shown in FIG. 5, an upper-right side of the surge tank 154 is formed with an air inlet 156 for introducing the air supplied from the intercooler 131 into the surge tank 154. Also, a lower part of the surge tank 154 is formed with an air outlet (not shown) for enabling the air temporarily stored in the surge tank 154 to flow to an intake passage formed in a throttle body 172 of the electronic control throttle device 171.

The electronic control throttle device 171 shown in FIG. 3 is a device configured to regulate an amount of the air, which is to pass through the intercooler 131 and the surge tank 154 and is to be supplied to an intake port of the engine 12. The electronic control throttle device 171 has a throttle body 172, a throttle valve provided in the throttle body 172 and configured to open and close an intake passage formed in the throttle body 172, and an electric driving motor 172 configured to drive the throttle valve.

The injector 174 is a device configured to inject the fuel to the intake port of the engine 12. To the injector 174, a delivery pipe 175 configured to supply the fuel from the fuel tank 241 to the injector 174 is connected.

Also, as shown in FIG. 6, the exhaust system has exhaust pipes 191 configured to interconnect exhaust ports of the engine 12 and the turbine unit 122 of the supercharger 121, a muffler joint pipe 192 configured to connect the turbine unit 122 of the supercharger 121 and a muffler-side, a muffler (not shown), and the like. The exhaust pipes 191 configure a part of the engine unit 11. The exhaust pipes 191 are disposed at the front of the engine 12 and between the exhaust ports and the turbine unit 122 of the supercharger 121. In the first illustrative embodiment, the exhaust pipes 191 are integrally formed with a housing of the turbine unit 122 of the supercharger 121. Specifically, one end-sides of the two exhaust pipes 191 are respectively connected to the two exhaust ports of the parallel two-cylinder engine 12. The other end-sides of the exhaust pipes 191 are coupled to each other to form one. The other end portion of the exhaust pipes 191 integrated into one is integrated with the housing of the turbine unit 122 of the supercharger 121. On the other hand, the exhaust pipe 191 and the housing of the turbine unit 122 may be formed as separate members and both members may be connected. Meanwhile, the muffler joint pipe 192 has one end-side connected to the turbine unit 122 of the supercharger 121 and the other end-side passing a lower-right side of the engine 12 and extending rearward toward the muffler. Also, the muffler is disposed at a rear-lower side of the engine 12. The exhaust gas discharged from the respective exhaust ports is supplied into the housing of the turbine unit 122 of the supercharger 121 via the exhaust pipes 191. By the exhaust gas, the turbine of the turbine unit 122 is rotated. Subsequently, the exhaust gas discharged from the turbine unit 122 is supplied to the muffler via the muffler joint pipe 192 and is discharged from the muffler to the outside.

Also, the turbine unit 122 of the supercharger 121 is provided with a waste gate valve 193. That is, the turbine unit 122 is provided therein with a gate configured to circulate a part of the exhaust gas supplied via the exhaust pipes 191 toward the muffler joint pipe 192 without supplying the same to the turbine. The waste gate valve 193 is configured to regulate an inflow amount of the exhaust gas to the turbine by opening and closing the gate.

(Arrangement and Connection of Respective Units of Intake System)

Figure 9:
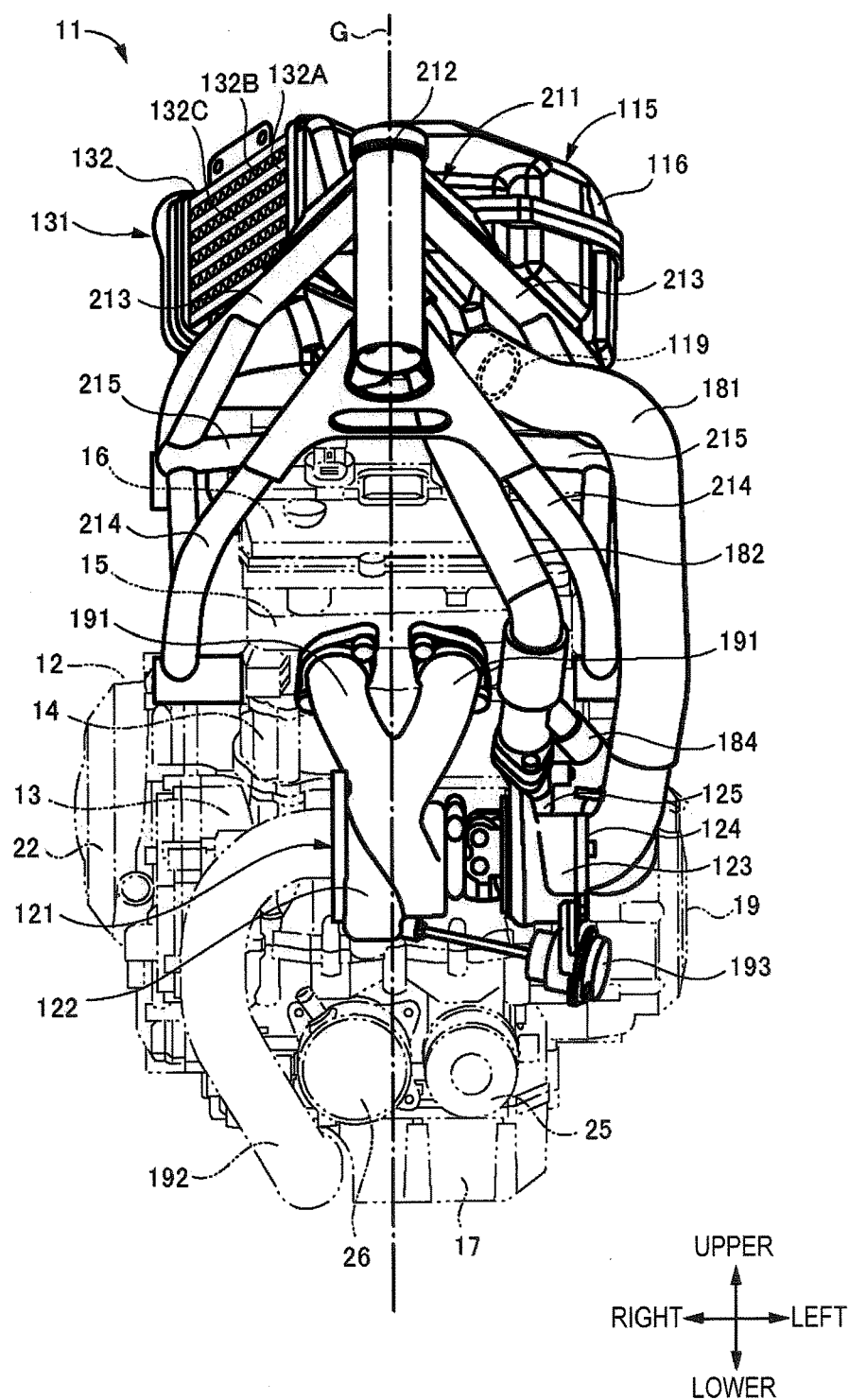
FIG. 9 illustrates arrangement of the vehicle body frame, an air intake pipe and an air outlet pipe and the like of the motorcycle having a supercharger, which is the first illustrative embodiment of the saddle-ridden type vehicle of the disclosure.
Figure 10:
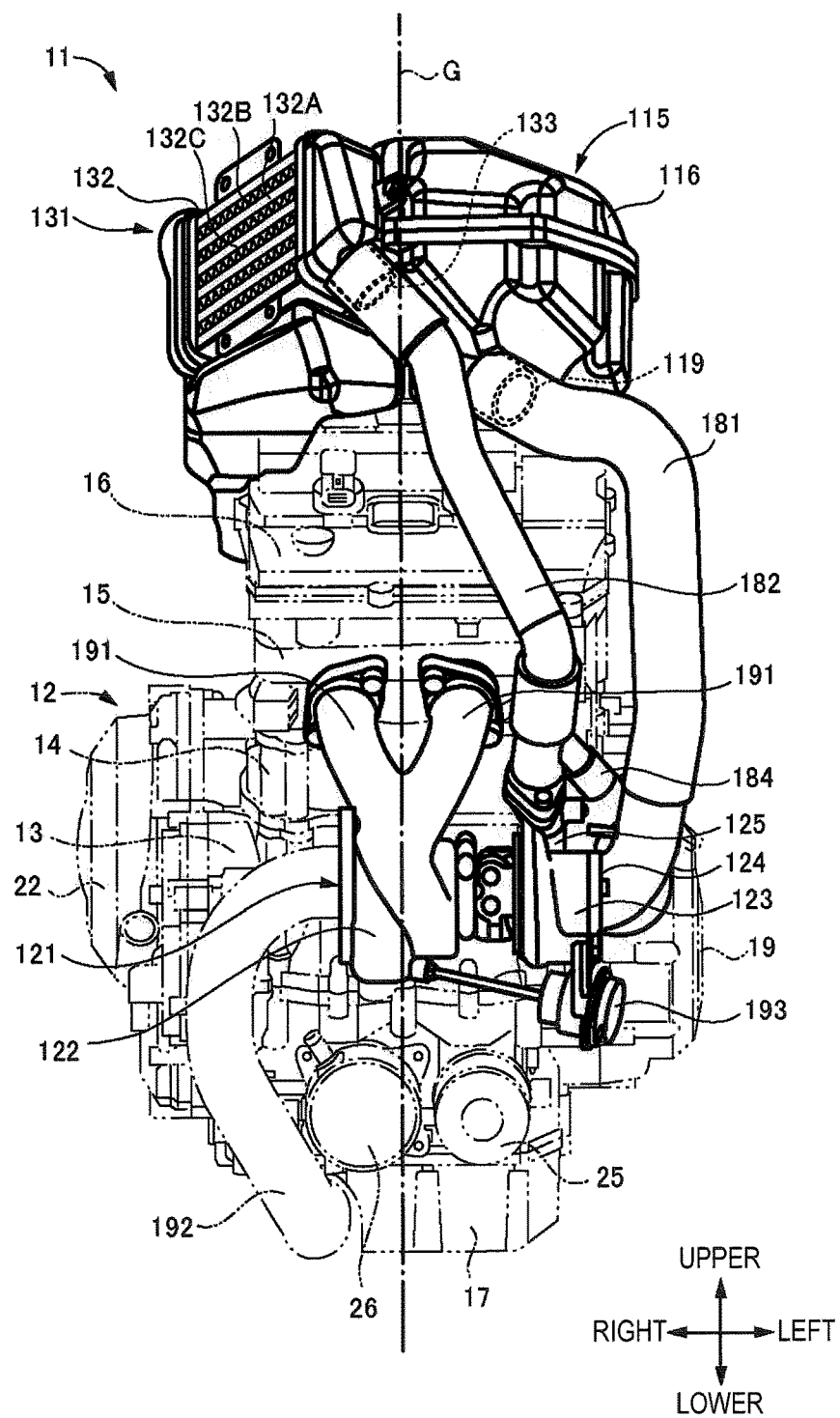
FIG. 10 illustrates arrangement of the air cleaner, the supercharger, the intercooler, the air intake pipe, the air outlet pipe and the like of the motorcycle having a supercharger, which is the first illustrative embodiment of the saddle-ridden type vehicle of the disclosure.
Figure 11:
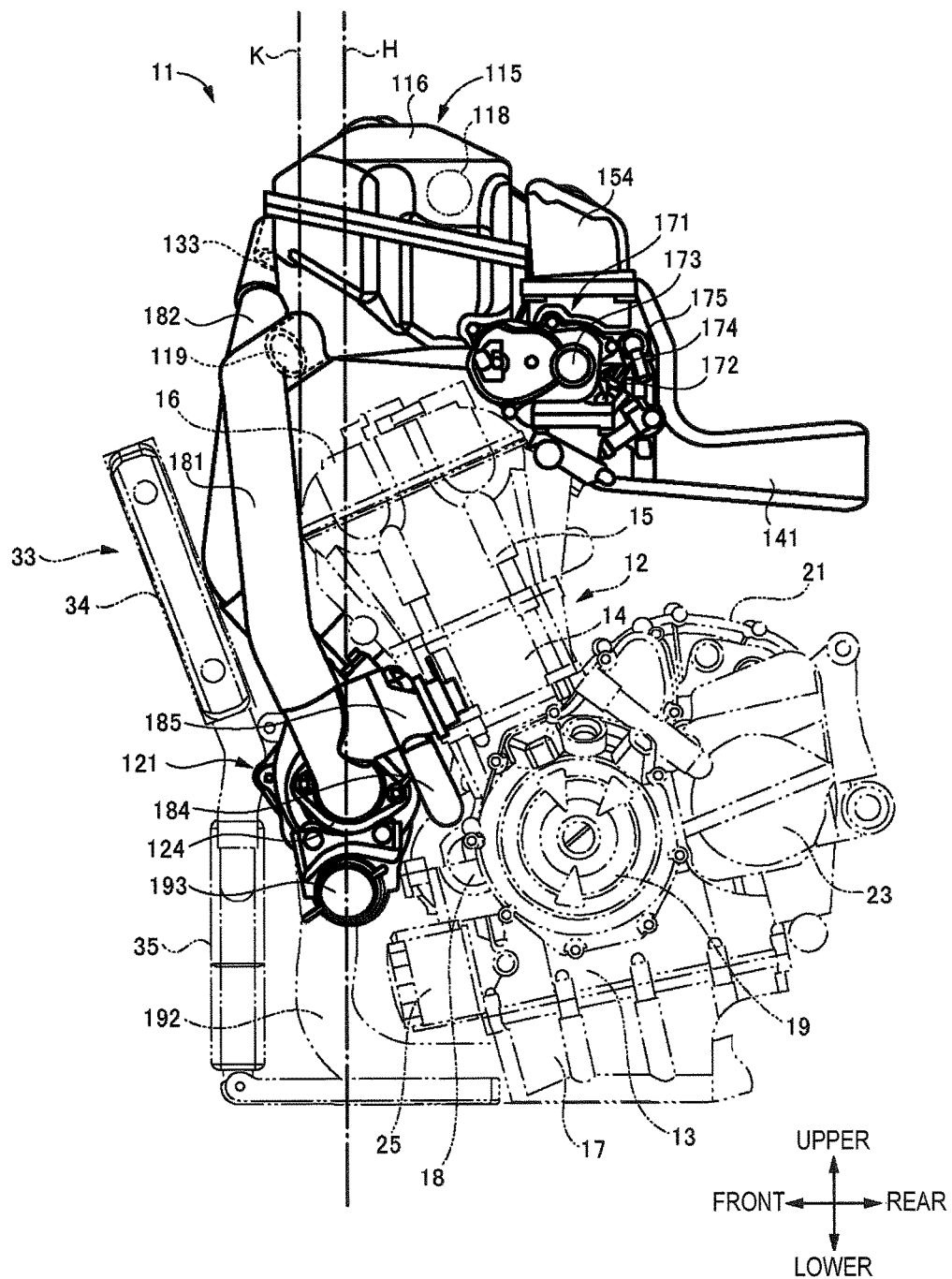
FIG. 11 illustrates arrangement of the engine, the radiator, the air cleaner, the supercharger, the air intake pipe, the air outlet pipe and the like of the motorcycle having a supercharger, which is the first illustrative embodiment of the saddle-ridden type vehicle of the disclosure.

FIGS. 9 to 11 depict arrangement and connection of the respective units configuring the intake system. As shown in FIG. 9, the supercharger 121 is disposed in front of the engine 12, specifically in front of the cylinder 14. Also, as shown in FIG. 11, the supercharger 121 is disposed above the balancer chamber 18 of the engine 12. Also, the supercharger 121 is positioned between the engine 12 and the radiator 33. Also, the supercharger 121 is disposed at a position between the upper radiator 34 and the lower radiator 35, and a front part of the supercharger 121 is positioned in a space between the upper radiator 34 and the lower radiator 35.

Also, as shown in FIG. 9, the supercharger 121 is disposed in the right-left direction so that the turbine unit 122 becomes a right side and the compressor unit 123 becomes a left side. Also, the turbine unit 122 is positioned below the exhaust ports of the engine 12 at a substantial center of the motorcycle 1 in the right-left direction of the motorcycle 1. Also, the compressor unit 123 is positioned at the left part of the motorcycle 1 and is also positioned at the left of a reference line G, which indicates a center of the motorcycle 1 in the right-left direction of the motorcycle 1. Also, the compressor unit 123 is configured by a centrifugal compressor, and an air intake port 124 is formed at a rotating shaft-side (center-side) of the centrifugal compressor and an air discharge port 125 is formed at an outer periphery-side of the centrifugal compressor, like the general centrifugal compressor. In the first illustrative embodiment, the compressor unit 123 is disposed at the left of the turbine unit 122, so that the air intake port 124 is formed at a left end portion of the compressor unit 123 and opens leftward and the air discharge port 125 is formed at a part of the outer periphery of the compressor unit 123 and is disposed at the right of the air intake port 124.

The air cleaner 115 is disposed at an upper-left side of the engine 12, specifically at an upper-left side of the cylinder head cover 16. Also, as shown in FIG. 3, the air cleaner 115 is positioned above the left main frame 213. Also, as shown in FIG. 11, a front part of the air cleaner 115 is positioned above the supercharger 121. Also, the air cleaner 115 is disposed at a position overlapping with the supercharger 121, as seen in a plan view of the motorcycle 1 (refer to FIG. 5). Also, the air outlet 119 formed at the front part of the air cleaner 115 is positioned just above the supercharger 121. In the meantime, a reference line H in FIG. 11 indicates a position of the supercharger 121 in the front-rear direction.

Also, as shown in FIG. 9, the intercooler 131 is disposed at an upper-right side of the engine 12, specifically at an upper-right side of the cylinder head cover 16. Further, as shown in FIG. 6, the intercooler 131 is disposed above the cooling water flow control unit 41. Also, as shown in FIG. 4, the intercooler 131 is disposed above the right main frame 213. Also, the front part of the intercooler 131 is disposed above the supercharger 121. Also, as seen in a plan view of the motorcycle 1, the intercooler 131 is disposed at a position overlapping with the supercharger 121 (refer to FIG. 5). Also, the air inlet 133 formed at the front part of the intercooler 131 is positioned just above the supercharger 121. In the meantime, the reference line H in FIG. 4 indicates a position of the supercharger 121 in the front-rear direction, like the reference line H in FIG. 11. Also, as shown in FIG. 9, the intercooler 131 is positioned at the right of the reference line G, which indicates the center of the motorcycle 1 in the right-left direction of the motorcycle 1. That is, the intercooler 131 is disposed at an opposite position to the compressor unit 123 of the supercharger 121 with respect to the right-left direction. Also, as shown in FIG. 5, the intercooler 131 is disposed so that the receiving surface 132C of the heat radiation part 132 is parallel with a part, which obliquely extends toward the right-rear side, of the front end portion of the right main frame 213. In the meantime, a reference line J in FIG. 5 indicates the extension direction of the front end portion of the right main frame 213.

Also, as shown in FIG. 10, the air cleaner 115 and the intercooler 131 are arranged side by side in the right-left direction above the engine 12 and are adjacent to each other. In the first illustrative embodiment, the intercooler 131 is attached to the right side of the air cleaner 115. Also, as shown in FIG. 5, the air cleaner 115 and the intercooler 131 are positioned between the leftmost part of the left main frame 213 and the rightmost part of the right main frame 213, as seen in a plan view of the motorcycle 1. That is, the air cleaner 115 is positioned at the right of a left surface of the leftmost convex part of the left main frame 213, and the intercooler 131 is positioned at the left of a right surface of the rightmost convex part of the right main frame 213. In the meantime, a reference line E in FIG. 5 indicates a position of the left surface of the leftmost convex part of the left main frame 213 in the right-left direction, and a reference line F indicates a position of the right surface of the rightmost convex part of the right main frame 213 in the right-left direction.

Also, as shown in FIG. 10, the air cleaner 115 and the compressor unit 123 of the supercharger 121 are interconnected by an air intake pipe 181. One end portion of the air intake pipe 181 is connected to the air outlet 119 of the air cleaner 115. A connection part between the air intake pipe 181 and the air outlet 119 of the air cleaner 115 is positioned above the supercharger 121, as shown in FIG. 11. Also, a position of the connection part in the front-rear direction is the same as the position of the front end portion of the cylinder head cover 16. A reference line K in FIG. 11 indicates a position of the front end portion of the cylinder head cover 16 in the front-rear direction. In the meantime, the position of the connection part in the front-rear direction may be set in front of the position of the front end portion of the cylinder head cover 16. Also, the other end portion of the air intake pipe 181 is connected to the air intake port 124 formed at a left part of the compressor unit 123 of the supercharger 121 and opening leftward. Also, as shown in FIG. 9, the air intake pipe 181 extends in the upper-lower direction in a region from the above of the engine 12 to the front thereof at the left of the engine 12. Specifically, the air intake pipe 181 extends by a short distance from the air outlet 119 of the air cleaner 115 toward a left-lower side and passes between the left main frame 213 and the left down tube 214. Then, the air intake pipe 181 extends downward with being bent, is bent rightward and reaches the air intake port 124 of the compressor unit 123 of the supercharger 121. In the first illustrative embodiment, the air intake pipe 181 passes the left (outer side) of the left down tube 214 and is disposed close to the left down tube 214 so as to be adjacent to the center of the motorcycle 1 in the right-left direction of the motorcycle 1 as close as possible. As a result, the leftmost protruding part of the air intake pipe 181 is substantially the same as the left surface of the magneto chamber 19 of the engine 12 but is piped to be positioned at the right thereof. Also, the air intake pipe 181 is entirely positioned at the left of the reference line G. Also, the air intake pipe 181 has both bent end portions, as described above. However, most of the air intake pipe except for both end portions extends linearly.

Also, as shown in FIG. 10, the compressor unit 123 of the supercharger 121 and the intercooler 131 are interconnected by an air outlet pipe 182. One end portion of the air outlet pipe 182 is connected to the air discharge port 125 formed at an upper part of the compressor unit 123 of the supercharger 121 and opening upward. Also, the other end portion of the air outlet pipe 182 is connected to the air inlet 133 of the intercooler 131. A connection part between the air outlet pipe 182 and the intercooler 131 is positioned above the supercharger 121, as shown in FIG. 11. Also, a position of the connection part in the front-rear direction is the same as the position of the front end portion of the cylinder head cover 16. On the other hand, the position of the connection part in the front-rear direction may be set in front of the position of the front end portion of the cylinder head cover 16. Also, as shown in FIG. 10, the air outlet pipe 182 extends in a region from the above of the engine 12 to the front thereof at the left of the engine 12. Also, the air outlet pipe 182 is positioned at the right of the air intake pipe 181, and is positioned at an inner side of the motorcycle 1 relative to the air intake pipe 181. Also, as shown in FIG. 9, the air outlet pipe 182 passes between the pair of main frames 213 and between the pair of down tubes 214. Also, as shown in FIG. 10, the air inlet 133 of the intercooler 131 is positioned at the right of the air discharge port 125 of the compressor unit 123 of the supercharger 121. Therefore, the air outlet pipe 182 is inclined rightward as it faces upward. However, most of the air outlet pipe 182 except for an upper end portion is positioned at the left of the reference line G. Also, the air outlet pipe 182 extends linearly as a whole.

Also, as shown in FIG. 9, the air intake pipe 181 and the air outlet pipe 182 are piped with the left down tube 214 being interposed therebetween. That is, the air intake pipe 181, the left down tube 214 and the air outlet pipe 182 are disposed in corresponding order from the left side of the motorcycle 1 toward the right (from the left outer side toward the inner side). Also, the air intake pipe 181 and the air outlet pipe 182 are respectively piped along the left down tube 214 extending from the center of the motorcycle 1 in the right-left direction of the motorcycle 1 toward the left-lower side, as seen in a front view of the motorcycle 1.

Also, as shown in FIG. 11, both the air intake pipe 181 and the air outlet pipe 182 are disposed in front of the engine 12, i.e., between the engine 12 and the radiator 33. That is, one end-side of the air intake pipe 181 is connected to the air outlet 119 of the air cleaner 115 positioned above the front end portion of the cylinder head cover 16, and the other end-side of the air intake pipe 181 is connected to the compressor unit 123 of the supercharger 121 disposed between the engine 12 and the radiator 33, so that the air intake pipe 181 is substantially entirely positioned between the engine 12 and the radiator 33 or in a space just above thereof. Also, one end-side of the air outlet pipe 182 is connected to the compressor unit 123 of the supercharger 121 disposed between the engine 12 and the radiator 33, and the other end-side of the air outlet pipe 182 is connected to the air inlet 133 of the intercooler 131 positioned above the front end portion of the cylinder head cover 16, so that the air outlet pipe 182 is entirely positioned between the engine 12 and the radiator 33 or in the space just above thereof.

In the meantime, as shown in FIG. 5, the surge tank 154 is disposed at the upper-rear side of the engine 12. Specifically, the surge tank 154 is disposed adjacent to the air cleaner 115 in the front-rear direction at the rear of the air cleaner 115. Also, the surge tank 154 is disposed close to the intercooler 131 disposed adjacent to the right side of the air cleaner 115. Also, as seen in a plan view of the motorcycle 1, the air cleaner 115, the intercooler 131 and the surge tank 154 are disposed in a triangular shape in a region above the engine 12 (for example, when the centers of the three components are linearly connected, a triangle is formed in the region above the engine 12).

Also, the intercooler 131 and the surge tank 154 are interconnected by a connecting pipe 183. The connecting pipe 183 is disposed at a right-rear side above the engine 12. Specifically, one end portion of the connecting pipe 183 is connected to the air outlet 134 of the intercooler 131, and the other end portion is connected to the air inlet 156 of the surge tank 154. Since the air outlet 134 of the intercooler 131 and the air inlet 156 of the surge tank 154 are disposed close to each other, a length of the connecting pipe 183 configured to connect them is short.

Also, as shown in FIG. 3, the throttle body 172 of the electronic control throttle device 171 is disposed between the surge tank 154 and the intake port of the engine 12 at a rear-upper side of the engine 12.

In the intake system connected as described above, the air introduced from the outside normally sequentially passes through the air cleaner 115, the air intake pipe 181, the compressor unit 123 of the supercharger 121, the air outlet pipe 182, the intercooler 131, the connecting pipe 183, the surge tank 154 and the throttle body 172 of the electronic control throttle device 171, and is then supplied to the intake port of the engine 12.

Also, as shown in FIG. 11, the intake system of the motorcycle 1 is provided with an air bypass piping 184 configured to interconnect the air intake pipe 181 and the air outlet pipe 182 without interposing the compressor unit 123 of the supercharger 121 and an air bypass valve 185 configured to switch communication and cutoff of the air bypass piping 184. The air bypass valve 185 opens when the throttle valve is completely closed upon deceleration, for example. Thereby, the air outlet pipe 182 and the air intake pipe 181 are enabled to communicate with each other via the air bypass piping 184 and the downstream compressed air of the compressor unit 123 of the supercharger 121 is escaped upstream, so that a downstream pressure of the compressor unit 123 is lowered.

The air bypass valve 185 is attached to the air intake pipe 181. Also, the air bypass valve 185 is disposed at the rear of a slightly upper part of the air intake pipe 181 relative to the end portion close to the compressor unit 123 of the supercharger 121. Also, the air bypass valve 185 is disposed above the crank case 13 of the engine 12, and is also disposed at a position overlapping with the front part of the cylinder 14, as seen in a side view of the motorcycle 1.

Also, the air bypass piping 184 has one end portion connected to the air bypass valve 185 and the other end portion connected to a slightly upper part of the end portion of the air outlet pipe 182 close to the supercharger 121. Both the air intake pipe 181 and the air outlet pipe 182 extend in the same direction, i.e., upward from the compressor unit 123 of the supercharger 121 and are disposed adjacent to each other. Therefore, a length of the air bypass piping 184 configured to interconnect the air intake pipe 181 (the air bypass valve 185) and the air outlet pipe 182 is short.

On the other hand, the air bypass valve 185 may be attached to the air outlet pipe 182, one end portion of the air bypass piping 184 may be connected to the air intake pipe 181, and the other end portion may be connected to the air bypass valve 185.

As described above, according to the motorcycle 1, which is the first illustrative embodiment of the saddle-ridden type vehicle of the disclosure, the supercharger 121 is disposed in front of the cylinder 14 and the air cleaner 115 and the intercooler 131 are disposed above the cylinder head cover 16 and the supercharger 121. That is, the air cleaner 115, the supercharger 121 and the intercooler 131 are concentrated in the small region from the front of the engine 12 to the above thereof. Also, the supercharger 121 is positioned above the balancer chamber 18, i.e., the supercharger 121 is positioned at the place corresponding to the part ranging from the upper part of the crank case 13 to the cylinder 14, as seen in a side view of the engine 12. Therefore, the supercharger 121 is disposed adjacent to both the air cleaner 115 and the intercooler 131 disposed above the engine 12.

In this way, since the air cleaner 115, the supercharger 121 and the intercooler 131 are concentrated, it is possible to shorten both the air intake pipe 181 and the air outlet pipe 182 and to linearly pipe the same. Further, since the air outlet 119 is formed at the front part of the air cleaner 115 and is positioned just above the supercharger 121 and the air inlet 133 is formed at the front part of the intercooler 131 and is positioned substantially just above the supercharger 121, it is possible to further shorten the air intake pipe 181 and the air outlet pipe 182, respectively. Therefore, it is possible to reduce a resistance against the air flowing through the air intake pipe 181 and the air outlet pipe 182, so that it is possible to increase a response of the engine 12 or to decrease a turbo lag. Also, it is possible to prevent the air intake pipe 181 or the air outlet pipe 182 from traversing laterally the engine 12, so that it is possible to reduce a vehicle width.

Also, the air cleaner 115 and the intercooler 131 are arranged side by side in the right-left direction above the engine 12, and the air outlet 119 of the air cleaner 115 and the air inlet 133 of the intercooler 131 are disposed close to each other. As a result, the upper end portions of the air intake pipe 181 and the air outlet pipe 182 are adjacent to each other. In the meantime, since a lower end portion of the air intake pipe 181 and a lower end portion of the air outlet pipe 182 are respectively connected to the air intake port 124 and the air discharge port 125 of the compressor unit 123 of the supercharger 121, they are adjacent to each other. Thereby, the air intake pipe 181 and the air outlet pipe 182 are close to each other and extend in the substantially same direction. Therefore, it is possible to concentrate the air intake pipe 181 and the air outlet pipe 182 and to shorten the same. Further, it is possible to shorten the air bypass piping 184 provided between the air intake pipe 181 and the air outlet pipe 182, so that it is possible to reduce the resistance against the air passing through the air bypass piping 184.

Also, since the intercooler 131 is disposed at the opposite side of the compressor unit 123 of the supercharger 121 in the right-left direction, it is possible to dispose the air intake pipe 181 configured to connect the air cleaner 115 and the air intake port 124 of the compressor unit 123 and the air outlet pipe 182 configured to connect the air discharge port 125 of the compressor unit 123 and the intercooler 131 so that they extend in parallel with each other, without intersecting the same. Therefore, it is possible to substantially linearly extend the air intake pipe 181 and the air outlet pipe 182 and to respectively shorten the air intake pipe 181 and the air outlet pipe 182. Also, the intercooler 131 is disposed at the opposite side to the compressor unit 123, so that the heavy components can be dispersedly disposed at the right and left sides to balance the right and left weights of the motorcycle 1.

Also, since the air cleaner 115 and the intercooler 131 are positioned between the leftmost part of the left main frame 213 and the rightmost part of the right main frame 213, as seen in a plan view of the motorcycle 1, it is possible to concentrate the air cleaner 115 and the intercooler 131 at the central part of the motorcycle 1 in the right-left direction of the motorcycle 1, thereby reducing the vehicle width.

Also, since the intercooler 131 is disposed so that the receiving surface 132C of the heat radiation part 132 is parallel with the front end portion of the right main frame 213, it is possible to prevent the intercooler 131 from protruding rightward beyond the right main frame 213, so that it is possible to suppress the increase in the vehicle width.

Also, the surge tank 154 is disposed adjacent to the air cleaner 115 in the front-rear direction at the rear of the air cleaner 115 and is close to the intercooler 131. Thereby, it is possible to shorten the connecting pipe 183, thereby reducing the resistance against the air flowing from the intercooler 131 to the surge tank 154. Also, the air cleaner 115 and the surge tank 154 are disposed adjacent to each other, so that it is possible to integrate the cleaner case 116 of the air cleaner 115 and the surge tank 154. For example, it is possible to form the cleaner case 116 of the air cleaner 115 and the surge tank 154 by a single molded product. Also, the cleaner case 116 of the air cleaner 115 and the surge tank 154 are integrated and the intercooler 131 is attached to the air cleaner 115, so that it is possible to form the air cleaner 115, the intercooler 131 and the surge tank 154, as a single unit. Thereby, it is possible to simplify the mounting process of the components upon the manufacturing of the motorcycle 1.

Also, as seen in a plan view of the motorcycle 1, the air cleaner 115, the intercooler 131 and the surge tank 154 are disposed in the triangular shape above the engine 12. Therefore, it is possible to increase a degree of concentrated arrangement of the air cleaner 115, the intercooler 131 and the surge tank 154 and to shorten the connecting pipe 183 configured to connect the intercooler 131 and the surge tank 154.

In the first illustrative embodiment, as shown in FIG. 6, the components of the cooling system such as the water pump 30, the cooling water flow control unit 41, the water pump inlet hose 55 and the like are disposed at the right side of the motorcycle 1, and the components of the intake system such as the air cleaner 115, the compressor unit 123 of the supercharger 121, the air intake pipe 181, the air outlet pipe 182 and the like are disposed at the left side of the motorcycle 1. However, the disclosure is not limited thereto. For example, the arrangements of the components may be reversed with respect to the right-left direction.

Also, the disclosure can be applied to a saddle-ridden type vehicle having a general unified radiator, which is not divided into an upper radiator and a lower radiator. Also, a thermostat having no sub-valve body may be used as the thermostat 43 of the cooling water flow control unit 41, and the flow path between the cooling water bypass passage 49 and the cooling water outlet 48 may be opened all the time, regardless of the temperature of the cooling water. Also, the saddle-ridden type vehicle of the disclosure is not limited to the motorcycle, and can be applied to a variety of saddle-ridden type vehicles such as a three-wheeled vehicle, a buggy car or the like having an engine.

Also, the disclosure can be appropriately changed without departing from the gist or spirit of the inventions that can be understood from the claims and the entire specification, and a saddle-ridden type vehicle having the change is also included in the technical spirit of the disclosure.

Second Illustrative Embodiment

Hereinafter, a second illustrative embodiment according to the disclosure will be described with reference to FIGS. 12 to 30. The same reference numerals and signs will be used in the drawings in order to designate some components when they are the same as or similar to those of the first illustrative embodiment.

(Motorcycle Having Supercharger)

Figure 12:
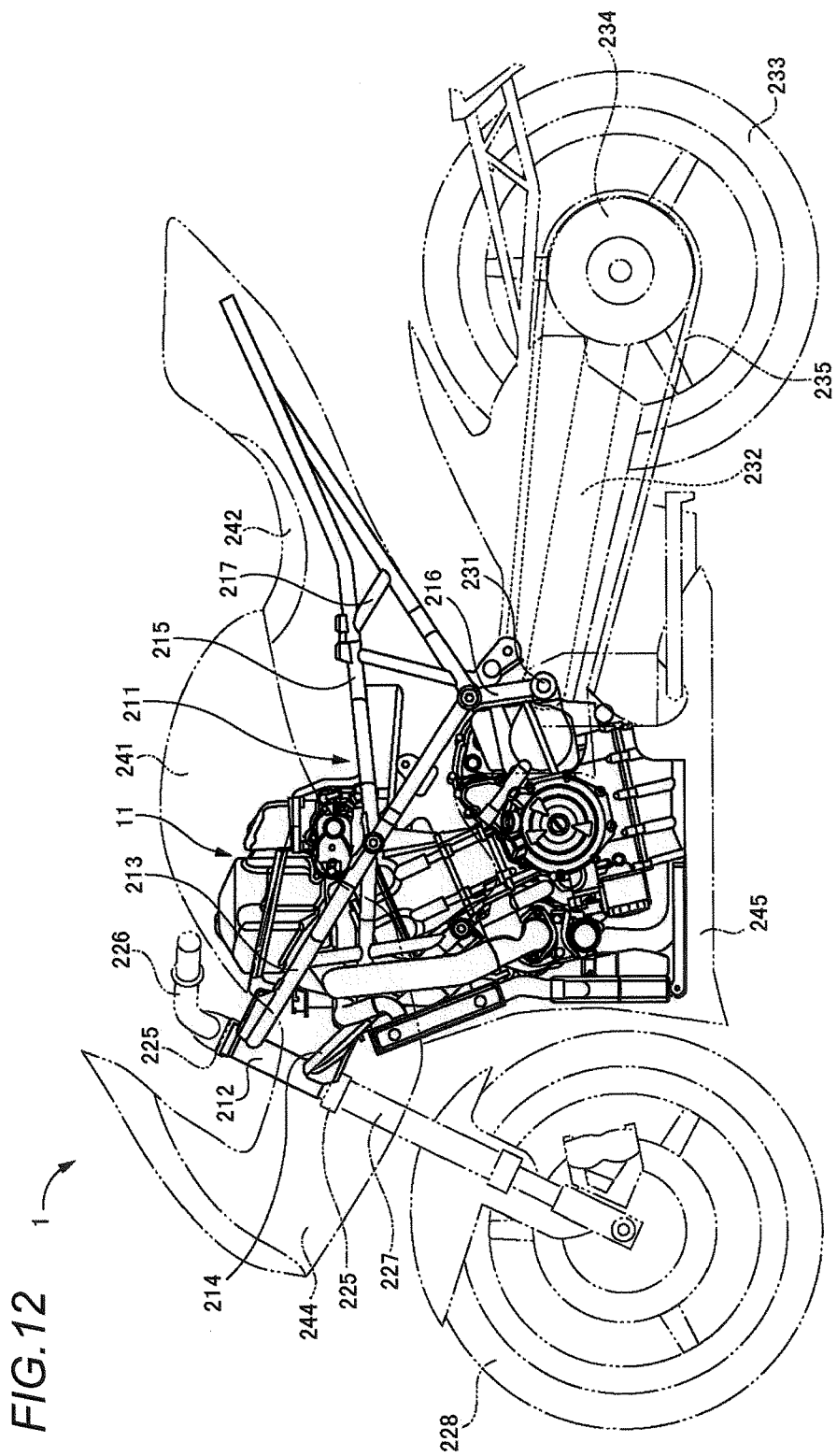
FIG. 12 illustrates a motorcycle having a supercharger, which is provided with an intake unit of a second illustrative embodiment of the intake device for an engine having a supercharger of the disclosure.

FIG. 12 illustrates a motorcycle having a supercharger, which is provided with an intake unit of the second illustrative embodiment of the intake device for an engine having a supercharger of the disclosure. In FIG. 12, parts except for a vehicle body frame 211 and an engine unit 11 of the motorcycle having the supercharger are shown with a dashed-two dotted line for convenience of explanations. Also, FIGS. 13 to 16 are a front view, a left side view, a right side view and a plan view of the vehicle body frame 211 and the engine unit 11, and FIG. 17 is a front view depicting a state where a radiator 33 has been removed from the engine unit 11. Also, in below descriptions of the second illustrative embodiment, front, rear, right, left, upper and lower directions are described on the basis of a driver who sits on a seat of the motorcycle having the supercharger.

In FIG. 12, a vehicle body frame 211 of a motorcycle 1 having a supercharger is formed by joining a plurality of steel pipes, for example. Specifically, the vehicle body frame 211 has a head pipe 212 disposed at a front-upper side of the motorcycle 1, a pair of main frames 213 each of which is disposed at right and left sides of the motorcycle 1, respectively, and has a front end portion connected to an upper part of the head pipe 212 and a rear end-side extending rearward with being inclined downward, a pair of down tubes 214 each of which is disposed at the right and left sides of the motorcycle 1, respectively, and has a front end portion connected to a lower part of the head pipe 212 and a rear end-side extending rearward with being inclined downward beyond the main frame 213, a pair of side frames 215 each of which is disposed at the right and left sides of the motorcycle 1, respectively, and has a front end portion connected to an intermediate part of the down tube 214 and a rear end-side extending rearward, and a pair of pivot frames 216 joined to the rear end-sides of the main frames 213. Also, a reinforcement frame 217 is provided among the main frame 213, the down tube 214 and the side frame 215.

Figure 16:
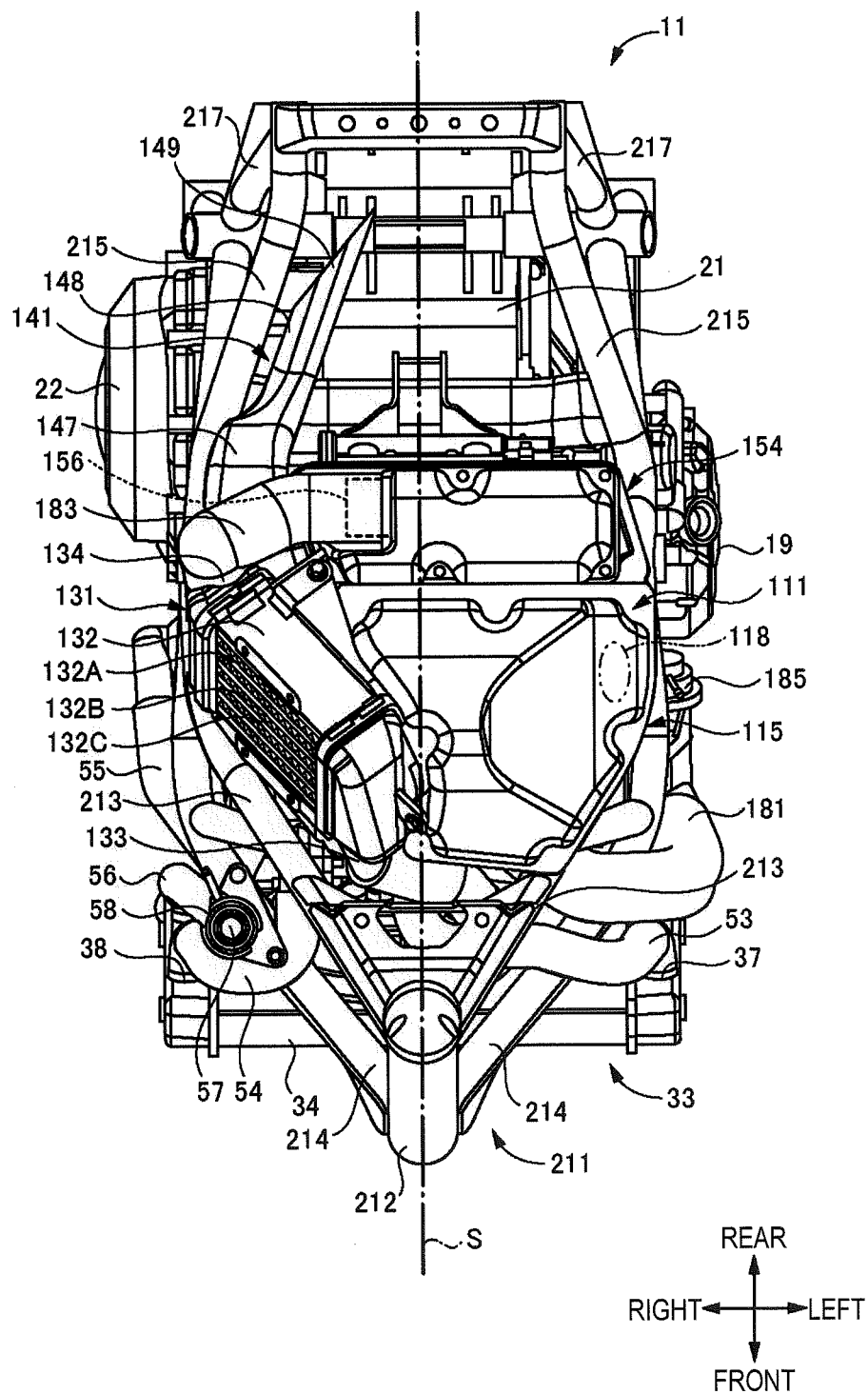
FIG. 16 is a plan view of the vehicle body frame and the engine unit shown in FIG. 13.
Figure 17:
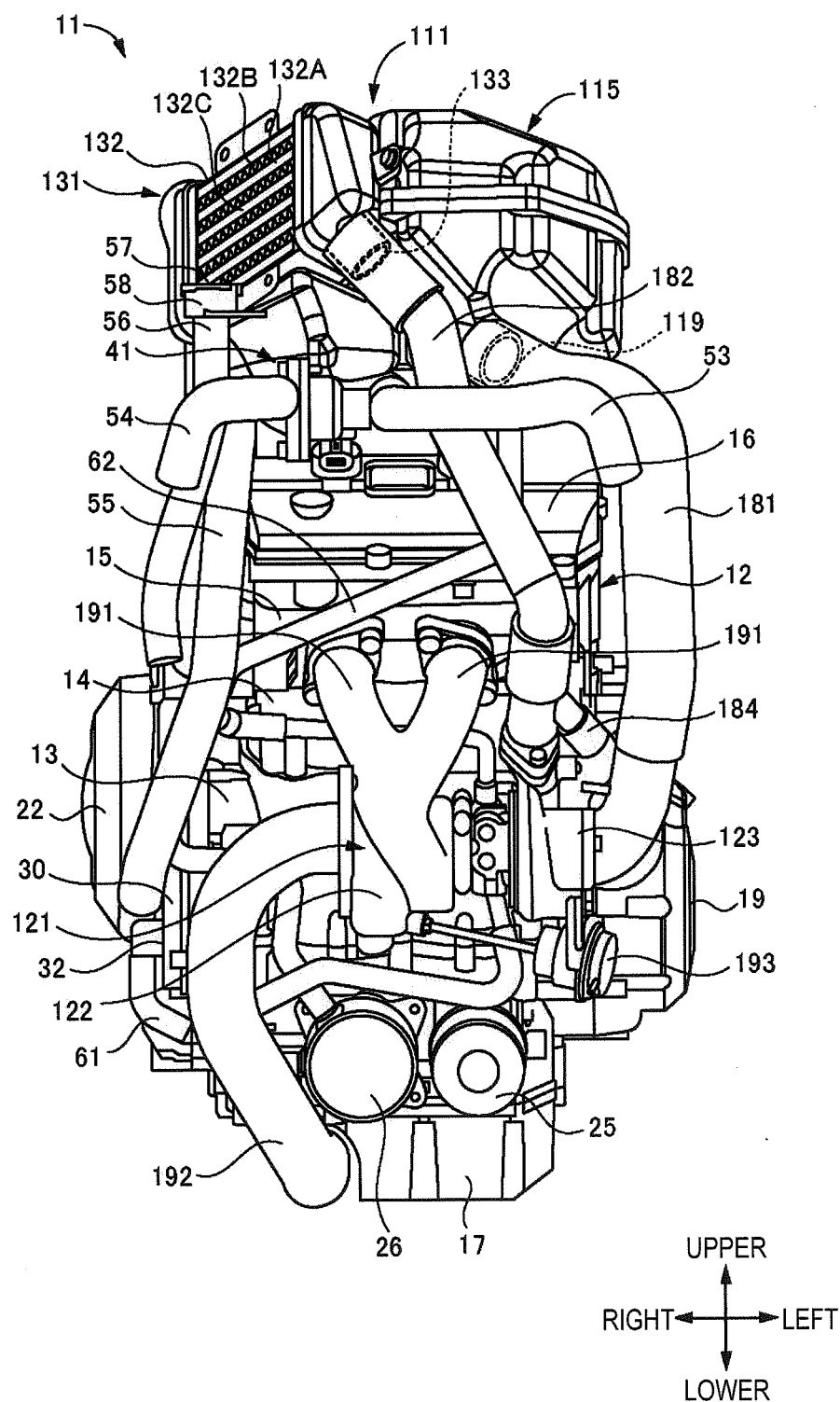
FIG. 17 is a front view depicting a state where a radiator has been removed from the engine unit shown in FIG. 13.

Also, as shown in FIG. 16, the pair of main frames 213 extends rearward with expanding leftward and rightward from the head pipe 212, respectively. That is, when a line passing a center of the motorcycle 1 in a right-left direction (vehicle width direction) of the motorcycle 1 in a front-rear direction of the motorcycle 1 is denoted as a reference line S, a front end portion of the right main frame 213 obliquely extends toward a right-rear side from the head pipe 212 disposed at a center of the motorcycle 1 in the right-left direction of the motorcycle 1. Then, the right main frame 213 is gently bent in the vicinity of a rear-right side of a cylinder head 15 of an engine 12 and extends rearward in parallel with the reference line S. Then, the right main frame 213 is slightly bent at a part beyond a rear surface of the cylinder head 15, and extends rearward with being slightly inclined leftward so as to gradually come close to the reference line S. In the meantime, the left main frame 213 has a substantially bilaterally symmetric shape to the right main frame 213 with respect to the reference line S. Also, the pair of down tubes 214 extends rearward with expanding leftward and rightward from the head pipe 212, respectively, like the pair of main frames 213. Also, the right side frame 215 extends rearward so that a front end portion thereof is connected to the right down tube 214 at a right-front position of the engine 12 and a rear end-side is parallel with the reference line S at the right of the engine 12. Also, the right main frame 215 is slightly bent in the vicinity of a part beyond a rear surface of the cylinder head 15 and extends rearward with being inclined leftward so as to gradually come close to the reference line S. In the meantime, the left side frame 215 has a substantially bilaterally symmetric shape to the right side frame 215 with respect to the reference line S.

Also, as shown in FIG. 12, a steering shaft (not shown) is inserted into the head pipe 212, and upper and lower end portions of the steering shaft are respectively provided with steering brackets 225. Also, the upper steering bracket 225 is provided with a handlebar 226. A pair of right and left front forks 227 is supported at upper parts thereof to the upper and lower steering brackets 225, and a front wheel 228 is supported to lower ends of the front forks 227.

Also, a front end-side of a swing arm 232 is supported between the pair of right and left pivot frames 216 via a pivot shaft 231, and a rear wheel 233 is supported to a rear end-side of the swing arm 232. Also, an axle of the rear wheel 233 is provided with a driven sprocket 234, and a chain 235 configured to transmit power of the engine 12 (which will be described later) is wound on the driven sprocket 234.

Also, the engine unit 11 is provided between the front wheel 228 and the rear wheel 233 of the motorcycle 1. The engine unit 11 is mainly disposed between the left main frame 213 and left down tube 214 and the right main frame 213 and right down tube 214 and is supported to the corresponding frames. Also, a fuel tank 241 is provided above the engine unit 11, and a seat 242 is provided at the rear of the fuel tank 241. Also, an upper cowl 244 is provided at a front-upper side of the motorcycle 1. Also, the motorcycle 1 is provided with an under cowl 245 configured to mainly cover a front-lower side of the engine unit 11.

(Engine Unit)

Figure 14:
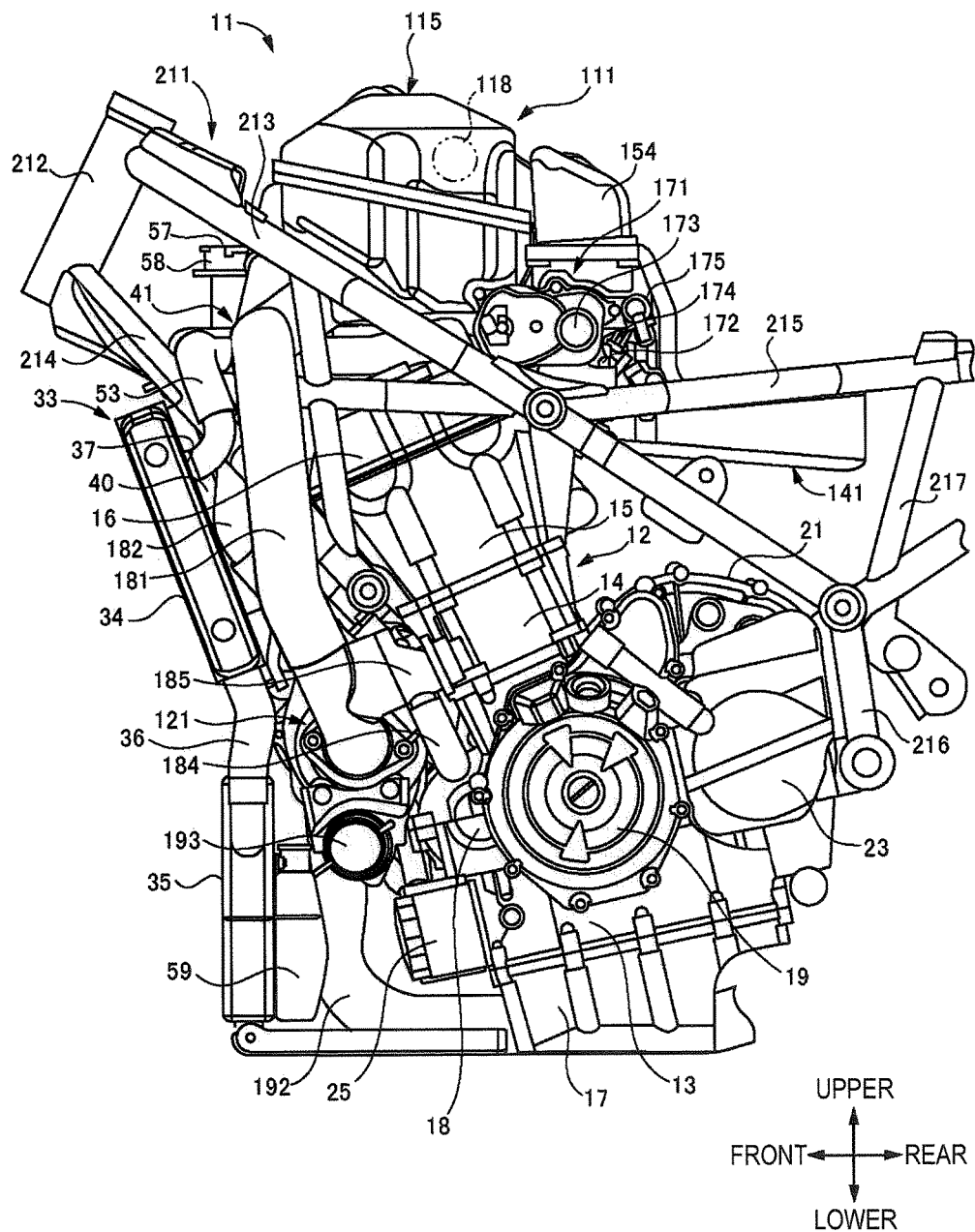
FIG. 14 is a left side view of the vehicle body frame and the engine unit shown in FIG. 13.

As shown in FIG. 14, the engine unit 11 has the engine 12, parts of a driving system configured to transmit power of the engine 12 to the rear wheel 233, such as a primary deceleration mechanism, a clutch, a transmission and the like, a lubrication system configured to lubricate a moveable part of the engine 12, an intake system (including a supercharger 113) configured to supply a fuel-air mixture of air and fuel to the engine 12, parts of an exhaust system configured to discharge an exhaust gas, which is to be generated as the fuel-air mixture is combusted, from the engine 12, a cooling system configured to cool the engine 12 and the like, an AC generator configured to generate power by using rotation of a crankshaft, and the like.

In the second illustrative embodiment, the engine 12 is a water-cooling type parallel two-cylinder four-cycle gasoline engine, for example. The engine 12 has a crank case 13 configured to accommodate therein a crankshaft, a cylinder 14 provided above the crank case 13, a cylinder head 15 provided above the cylinder 14 and a cylinder head cover 16 provided above the cylinder head 15. Also, an oil pan 17 is provided below the crank case 13. A cylinder axis of the engine 12 is inclined so that an upper side is located at a forward position relative to a lower side. The engine 12 is provided with a balance shaft configured to reduce vibrations, which are to be generated by movement of a piston. The balance shaft is disposed in front of the crankshaft and is provided in a balancer chamber 18 formed at a front part of the crank case 13 of the engine 12. Also, a left part of the crank case 13 is provided with a magneto chamber 19, and the AC generator is accommodated in the magneto chamber 19.

Figure 15:
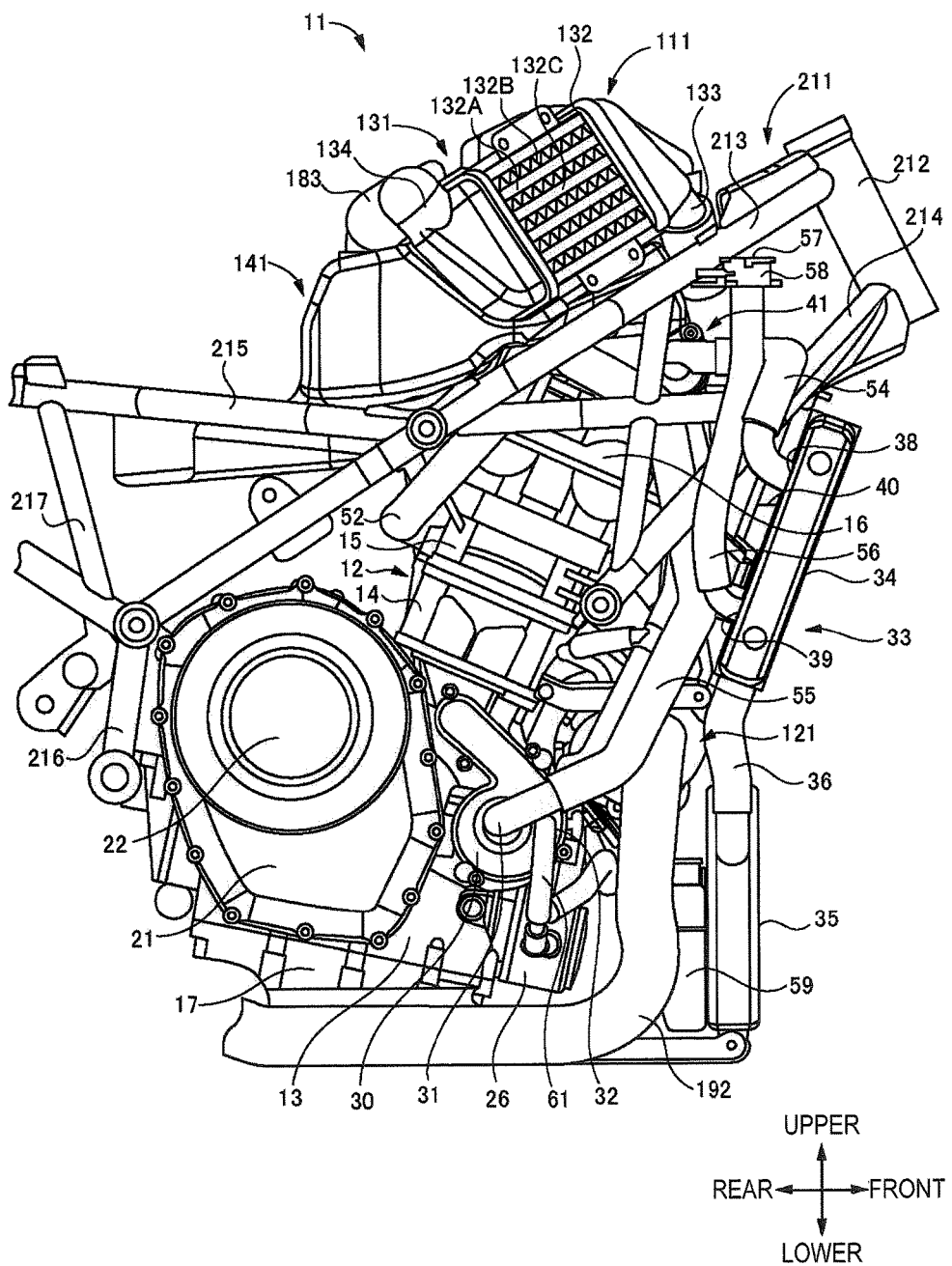
FIG. 15 is a right side view of the vehicle body frame and the engine unit shown in FIG. 13.

Also, as shown in FIG. 15, parts of the driving system such as the primary deceleration mechanism, the clutch, the transmission and the like are disposed at the rear part of the engine unit 11. That is, a transmission case 21 is integrally formed at rear sides of the crank case 13 and the cylinder 14, and the primary deceleration mechanism and the transmission are accommodated in the transmission case 21. Also, a clutch cover 22 is attached to a right part of the transmission case 21, and the clutch disposed at the right of the transmission is covered by the clutch cover 22. Also, as shown in FIG. 14, a sprocket cover 23 is provided at a left part of the transmission case 21, and a drive sprocket disposed at a left side of the transmission is covered by the sprocket cover 23. Also, the drive sprocket is wound with a chain 235 configured to transmit the power of the engine 12 to the rear wheel 233, as shown in FIG. 12.

Also, as shown in FIG. 17, the lubrication system has an oil pump configured to pump engine oil stored in the oil pan 17 of the engine 12 and to supply the same to the respective parts of the engine 12, an oil filter 25 configured to filter the engine oil and a water-cooling type oil cooler 26 configured to cool the engine oil. The oil filter 25 and the oil cooler 26 are attached to a front-lower side of the engine 12.

Figure 13:
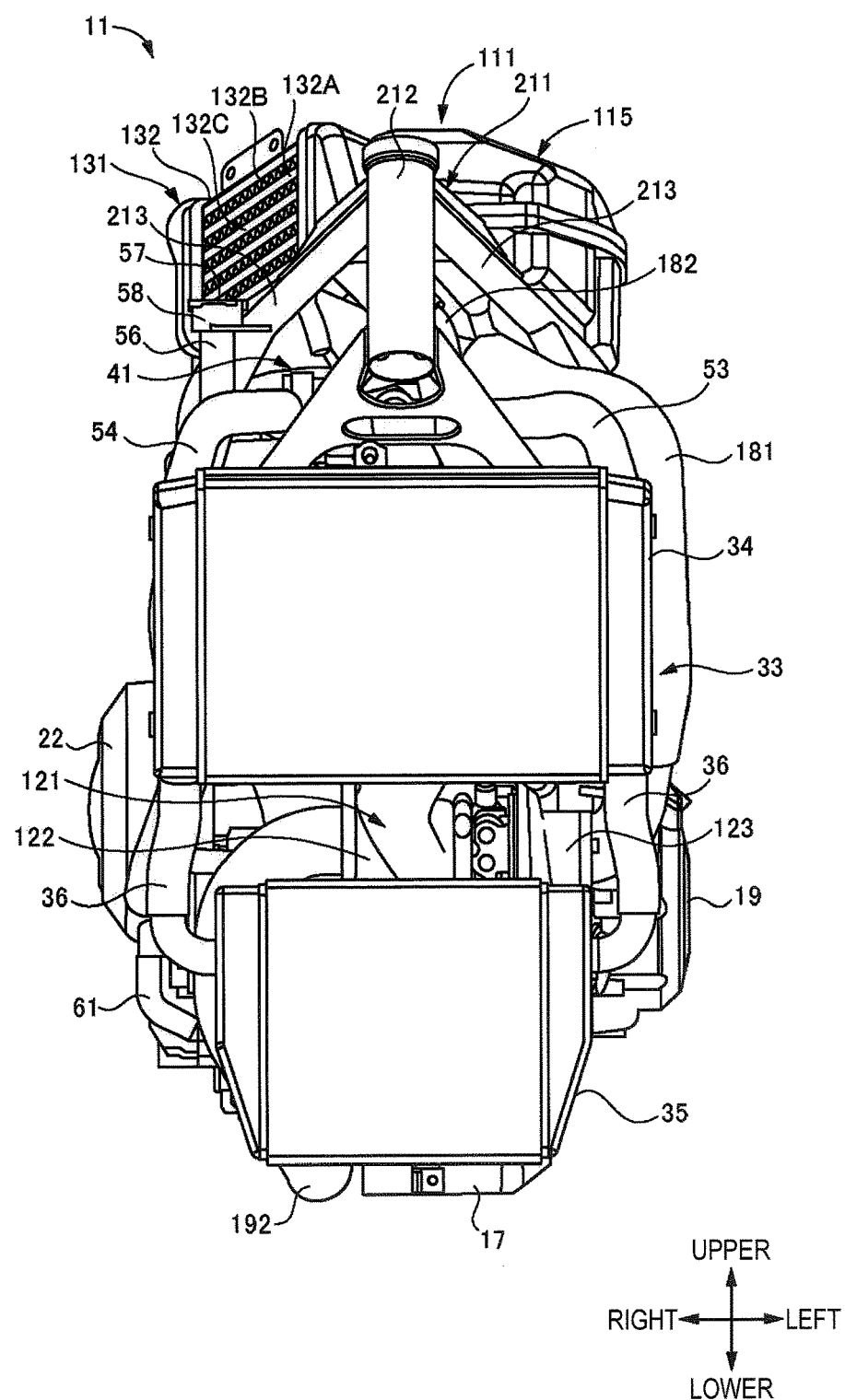
FIG. 13 is a front view of a vehicle body frame and an engine unit of the motorcycle having a supercharger in FIG. 12.

Also, as shown in FIG. 15, the cooling system has a water pump 30 disposed at a right side of the crank case 13 and configured to discharge the cooling water, a water jacket (not shown) provided in the cylinder 14 and the cylinder head 15 and configured to cool the cylinder 14 and the cylinder head 15 by the cooling water, and a radiator 33 disposed in front of the engine 12 and configured to receive traveling wind or to drive a radiator fan 40, thereby radiating heat of the cooling water to the atmosphere to cool the cooling water. Also, as shown in FIG. 13, the radiator 33 has an upper radiator 34 and a lower radiator 35, and the upper radiator 34 and the lower radiator 35 are interconnected via a pair of connecting hoses 36.

Figure 18:
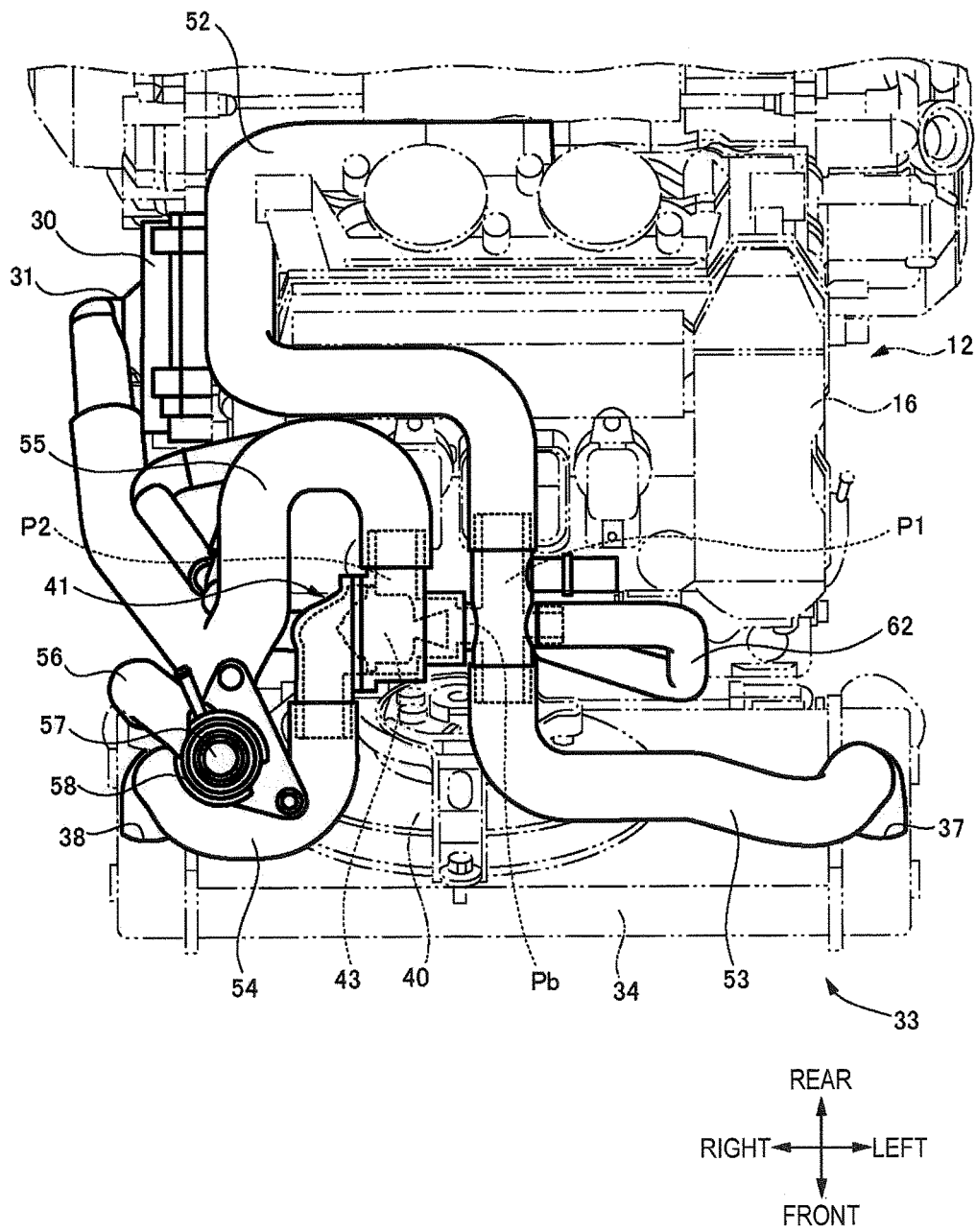
FIG. 18 illustrates a cooling water flow control unit, a cylinder outlet hose, a radiator inlet hose, a radiator outlet hose, a water pump inlet hose and the like of the motorcycle having a supercharger, which is provided with an intake unit of the second illustrative embodiment of the intake device for an engine having a supercharger of the disclosure.
Figure 21:
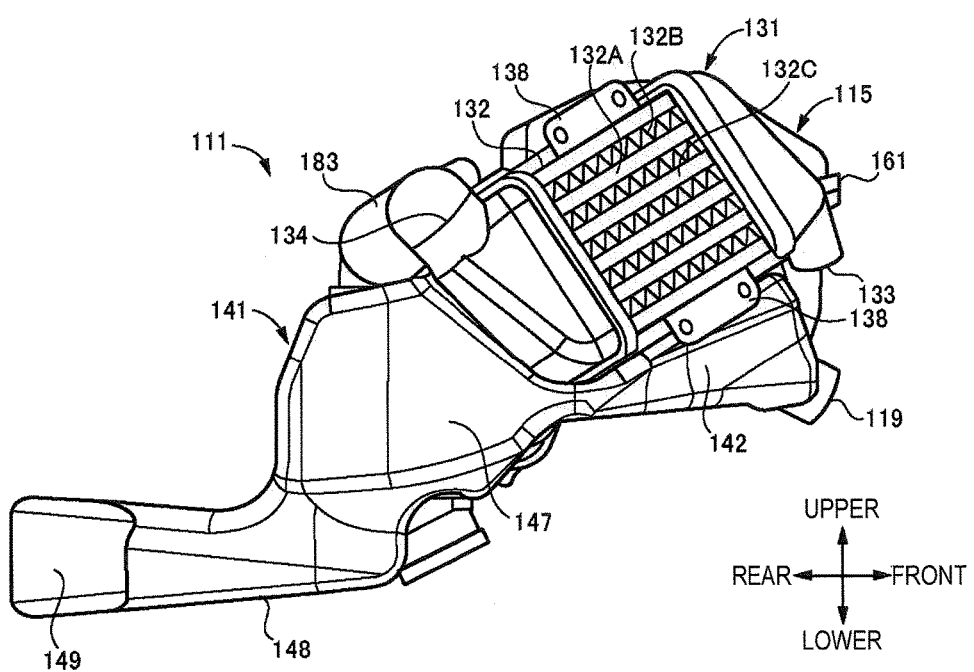
FIG. 21 is a right side view of the intake unit and the like in FIG. 19.

Further, the cooling system has a cooling water flow control unit 41 configured to regulate an amount of the cooling water to flow in the radiator 33 in accordance with a temperature of the cooling water and to maintain the temperature of the cooling water to an appropriate temperature. FIG. 18 is a plan view of a front part of the engine unit 11 from which the air cleaner 115, the intercooler 131, the surge tank 154 and the like have been omitted. In FIG. 18, the engine 12, the radiator 33 and the like are shown with the dashed-two dotted line so as to prominently express the cooling water flow control unit 41, a cylinder outlet hose 52, a radiator inlet hose 53, a radiator outlet hose 54, a water pump inlet hose 55 and the like.

As shown in FIG. 18, the cooling water flow control unit 41 is disposed at a right-front side above the cylinder head cover 16. Also, a left part of the cooling water flow control unit 41 is formed therein with a passage P1 for supplying the cooling water from the water jacket to the radiator 33. A cylinder outlet hose 52 is connected between an inlet-side of the passage P1 and an outlet-side of the water jacket, and a radiator inlet hose 53 is connected between an outlet-side of the passage P1 and a radiator inlet 37 of the radiator 33.

Also, a right part of the cooling water flow control unit 41 is formed therein with a passage P2 for returning the cooling water from the radiator 33 to the water pump 30. A radiator outlet hose 54 is connected between a radiator outlet 38 of the radiator 33 and an inlet-side of the passage P2, and a water pump inlet hose 55 is connected between an outlet-side of the passage P2 and a cooling water intake port 31 of the water pump 30.

Also, the cooling water flow control unit 41 is formed therein with a cooling water bypass passage Pb configured to connect the passage P1 and the passage P2.

Further, the cooling water flow control unit 41 is provided therein with a thermostat 43. The thermostat 43 is configured to regulate an amount of the cooling water to flow in the radiator 33 in accordance with the temperature of the cooling water. That is, when the temperature of the cooling water is equal to or lower than a predetermined reference temperature T1, the thermostat 43 controls flow of the cooling water so that the cooling water flows in a first circulation path formed by the water pump 30, the water jacket, the cylinder outlet hose 52, the passage P1, the cooling water bypass passage Pb, the passage P2 and the water pump inlet hose 55, and disables the cooling water from flowing in the radiator 33. On the other hand, when the temperature of the cooling water is higher than a predetermined reference temperature T2 (T2>T1), the thermostat 43 controls flow of the cooling water so that the cooling water flows in a second circulation path formed by the water pump 30, the water jacket, the cylinder outlet hose 52, the passage P1, the radiator inlet hose 53, the radiator 33, the radiator outlet hose 54, the passage P2 and the water pump inlet hose 55, and enables the cooling water to flow in the radiator 33. On the other hand, when the temperature of the cooling water is higher than the reference temperature T1 and is equal to or lower than the reference temperature T2, the thermostat 43 controls flow of the cooling water so that the cooling water flows in both the first circulation path and the second circulation path, and enables a part of the cooling water to flow in the radiator 33.

Also, as shown in FIG. 15, a cooling water injection part 58 having a cooling water injection port 57 is provided at a right-upper side of the radiator 33. The cooling water injection part 58 is connected to a cooling water supply port 39 formed at a right-lower side of a rear surface of the upper radiator 34 through a water injection hose 56. Also, a reservoir tank 59 configured to reserve therein the cooling water is provided at the rear of the lower radiator 35, and the reservoir tank 59 is connected to the upper radiator 34 via an overflow pipe line (not shown), for example.

(Structures of Intake System and Exhaust System)

Also, as shown in FIG. 14 or 17, the intake system has an air cleaner 115, a supercharger 121, an intercooler 131, an air discharging duct 141, a surge tank 154, an electronic control throttle device 171 and an injector 174.

The air cleaner 115 is a device configured to filter and purify air for fuel combustion introduced from an outside. The air cleaner 115 is disposed at an upper-left side of the engine 12, specifically at an upper-left side of the cylinder head cover 16. Also, a front part of the air cleaner 115 is positioned above the supercharger 121. Also, as shown in FIG. 14, the air cleaner 115 has an air intake port 118 configured to introduce the exterior air into the air cleaner 115. Also, the air intake port 118 of the air cleaner 115 is provided with an air duct (not shown) configured to guide the exterior air into the air intake port 118. Also, as shown in FIG. 17, the air cleaner 115 has an air outlet 119 for enabling the filtered air to flow from the air cleaner 115.

As shown in FIG. 14, the supercharger 121 is disposed in front of the engine 12, specifically in front of the cylinder 14. Also, the supercharger 121 is disposed above the balancer chamber 18 of the engine 12. As shown in FIG. 17, the supercharger 121 has a turbine unit 122 having a turbine, and a compressor unit 123. The supercharger 121 is configured to drive the turbine of the turbine unit 122 by the exhaust gas from the engine 12, to drive the compressor unit 123 by power of the turbine and to compress the air supplied through the air cleaner 115 by the compressor unit 123. Also, the supercharger 121 is disposed so that the turbine unit 122 becomes a right side and the compressor unit 123 becomes a left side. Also, the air outlet 119 of the air cleaner 115 and the compressor unit 123 of the supercharger 121 are interconnected by an air intake pipe 181.

The intercooler 131 is a heat exchanger configured to cool the air of which temperature has increased resulting from the compression by the compressor unit 123 of the supercharger 121. As shown in FIG. 17, the intercooler 131 is disposed at a right side above the engine 12, more specifically, at a right side above the cylinder head cover 16. Also, a front part of the intercooler 131 is positioned above the supercharger 121. Also, the intercooler 131 is disposed at an opposite side to the compressor unit 123 of the supercharger 121 with respect to the right-left direction. Also, the intercooler 131 is disposed adjacent to a right side of the air cleaner 115. The intercooler 131 is an air-cooling type, and has a passage 132A for flowing the air compressed by the compressor unit 123 and a heat radiation part 132 having fins 132B configured to receive the exterior air and to radiate the heat of the air compressed by the compressor unit 123. Also, the heat radiation part 132 has a receiving surface 132C configured to receive the exterior air for heat radiation. Also, a front part of the intercooler 131 is formed with an air inlet 133 for introducing the air supplied from the compressor unit 123 of the supercharger 121 into the passage 132A of the heat radiation part 132. Also, as shown in FIG. 15 or 16, a rear part of the intercooler 131 is formed with an air outlet 134 for supplying the air to the surge tank 154, which has flowed in the passage 132A of the heat radiation part 132 and has been thus cooled. Also, the compressor unit 123 of the supercharger 121 and the air inlet 133 of the intercooler 131 are interconnected by an air outlet pipe 182.

Also, an air guide duct (not shown) configured to guide the exterior air to the heat radiation part 132 of the intercooler 131 as a cooling air is provided in front of the intercooler 131. Also, the intercooler 131 is provided with an air guide duct attachment part 138 (refer to FIG. 19) for connecting the air guide duct.

Also, as shown in FIG. 16, the air discharging duct 141 configured to discharge the cooling air discharged from the intercooler 131 to the outside is provided at the rear of the intercooler 131. The air discharging duct 141 is configured to discharge the cooling air, which has been guided by the air guide duct, has collided with the heat radiation part 132 of the intercooler 131 and has passed between the fins 132B of the heat radiation part 132, to the outside. The temperature of the cooling air having passed through the heat radiation part 132 increases by cooling the air flowing in the passage 132A of the intercooler 131. The air discharging duct 141 is configured to determine a position and a direction in which the cooling air of which temperature has increased is to be discharged to the outside. Also, the air discharging duct 141 is disposed so that a front part thereof is positioned at a right-upper side of the engine 12 and a rear part is positioned at the rear of the engine 12. Also, the air discharging duct 141 is disposed between the pair of main frames 213, as seen in a plan view of the motorcycle 1. Also, as shown in FIG. 15, the air discharging duct 14 extends toward the rear of the engine 12 along the right side frame 215, as seen in a side view of the motorcycle 1. Also, the air discharging duct 141 is gently bent toward a center in the vehicle width direction, and extends so that it comes close to the center in the vehicle width direction as it faces rearward. In the meantime, the air discharging duct 141 will be additionally described later.

The surge tank 154 is a device configured to rectify the flow of the air compressed by the supercharger 121 and cooled by the intercooler 131. As shown in FIG. 16, the surge tank 154 is disposed at the rear above the engine 12. Also, the surge tank 154 is disposed adjacent to the rear of the air cleaner 115. Also, an upper-right side of the surge tank 154 is formed with an air inlet 156 for introducing the air supplied from the intercooler 131 into the surge tank 154. Also, a lower part of the surge tank 154 is formed with an air outlet 157 (refer to FIG. 24) for enabling the air temporarily stored in the surge tank 154 to flow into an intake passage formed in a throttle body 172 of the electronic control throttle device 171. Also, the air outlet 134 of the intercooler 131 and the air inlet 156 of the surge tank 154 are interconnected by a connecting pipe 183. Also, the air outlet 134 of the intercooler 131 and the air inlet 156 of the surge tank 154 are adjacent to each other, so that a length of the connecting pipe 183 configured to connect them is short.

The electronic control throttle device 171 shown in FIG. 14 is a device configured to regulate an amount of the air, which is to pass through the intercooler 131 and the surge tank 154 and is to be supplied to an intake port of the engine 12. The electronic control throttle device 171 has a throttle body 172, a throttle valve provided in the throttle body 172 and configured to open and close an intake passage formed in the throttle body 172, and an electric driving motor 172 configured to drive the throttle valve. The throttle body 172 of the electronic control throttle device 171 is disposed between the surge tank 154 and the intake port of the engine 12 at a rear-upper side of the engine 12.

The injector 174 is a device configured to inject the fuel to the intake port of the engine 12. To the injector 174, a delivery pipe 175 configured to supply the fuel from the fuel tank 241 to the injector 174 is connected.

In the intake system connected as described above, the air introduced from the outside normally sequentially passes through the air cleaner 115, the air intake pipe 181, the compressor unit 123 of the supercharger 121, the air outlet pipe 182, the intercooler 131, the connecting pipe 183, the surge tank 154 and the throttle body 172 of the electronic control throttle device 171, and is then supplied to the intake port of the engine 12.

Also, as shown in FIG. 14, the intake system of the motorcycle 1 is provided with an air bypass piping 184 configured to interconnect the air intake pipe 181 and the air outlet pipe 182 without interposing the compressor unit 123 of the supercharger 121 and an air bypass valve 185 configured to switch communication and cutoff of the air bypass piping 184. The air bypass valve 185 opens when the throttle valve is completely closed upon deceleration, for example. Thereby, the air outlet pipe 182 and the air intake pipe 181 are enabled to communicate with each other via the air bypass piping 184 and the downstream compressed air of the compressor unit 123 of the supercharger 121 is escaped upstream, so that a downstream pressure of the compressor unit 123 is lowered.

Also, as shown in FIG. 17, the exhaust system has exhaust pipes 191 configured to interconnect exhaust ports of the engine 12 and the turbine unit 122 of the supercharger 121, a muffler joint pipe 192 configured to connect the turbine unit 122 of the supercharger 121 and a muffler-side, a muffler (not shown), and the like. The exhaust pipes 191 configure a part of the engine unit 11. The exhaust pipes 191 are disposed at the front of the engine 12 and between the exhaust ports and the turbine unit 122 of the supercharger 121. In the second illustrative embodiment, the exhaust pipes 191 are integrally formed with a housing of the turbine unit 122 of the supercharger 121. Specifically, one end-sides of the two exhaust pipes 191 are respectively connected to the two exhaust ports of the parallel two-cylinder engine 12. The other end-sides of the exhaust pipes 191 are coupled to each other to form one. The other end portion of the exhaust pipes 191 integrated into one is integrated with the housing of the turbine unit 122 of the supercharger 121. On the other hand, the exhaust pipe 191 and the housing of the turbine unit 122 may be formed as separate members and both members may be connected. Meanwhile, the muffler joint pipe 192 has one end-side connected to the turbine unit 122 of the supercharger 121 and the other end-side passing a lower-right side of the engine 12 and extending rearward toward the muffler. Also, the muffler is disposed at a rear-lower side of the engine 12. The exhaust gas discharged from the respective exhaust ports is supplied into the housing of the turbine unit 122 of the supercharger 121 via the exhaust pipes 191. By the exhaust gas, the turbine of the turbine unit 122 is rotated. Subsequently, the exhaust gas discharged from the turbine unit 122 is supplied to the muffler via the muffler joint pipe 192 and is discharged from the muffler to the outside.

Also, the turbine unit 122 of the supercharger 121 is provided with a waste gate valve 193. That is, the turbine unit 122 is provided therein with a gate configured to circulate a part of the exhaust gas supplied via the exhaust pipes 191 toward the muffler joint pipe 192 without supplying the same to the turbine. The waste gate valve 193 is configured to regulate an inflow amount of the exhaust gas to the turbine by opening and closing the gate.

(Intake Unit and Air Discharging Duct)

Regarding the components of the intake system, the air cleaner 115, the intercooler 131, the air discharging introduction part 142 of the air discharging duct 141 and the surge tank 154 are integrated as a single unit. In the below, an integrated configuration of the air cleaner 115, the intercooler 131, the air discharging introduction part 142 of the air discharging duct 141 and the surge tank 154 is referred to as an intake unit 111. The intake unit 111 is an example of the intake device for an engine having a supercharger of the disclosure.

Figure 24:
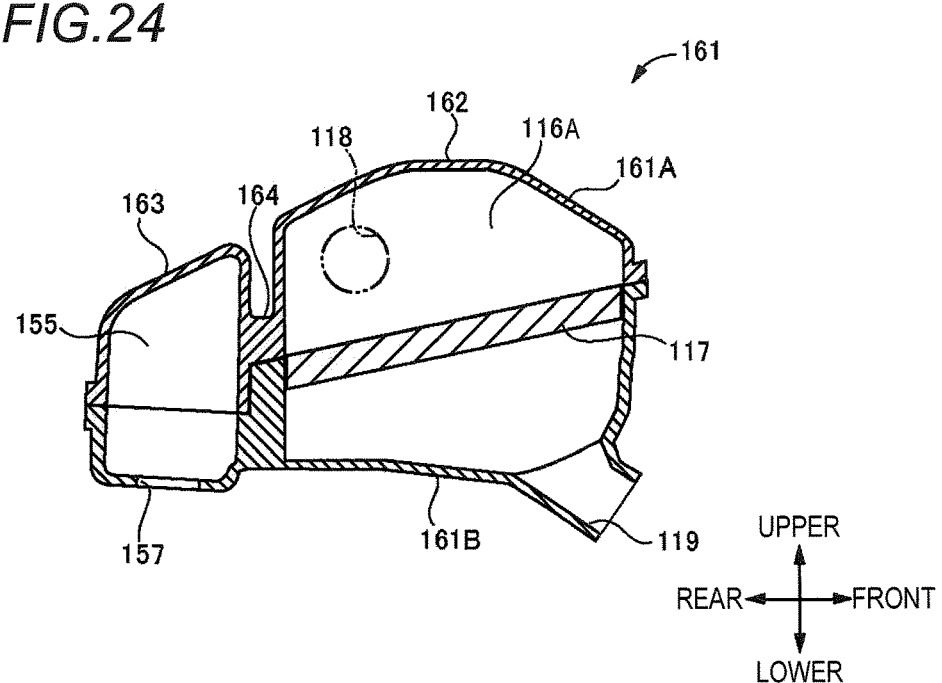
FIG. 24 is a sectional view of a unit case of the intake unit taken along an arrow A-A in FIG. 19.

FIGS. 19 to 23 are a front view, a left side view, a right side view, a plan view and a rear view of the intake unit 111 and the electronic control throttle device 171. FIG. 24 is a sectional view of a unit case 161 of the intake unit 111 taken along an arrow A-A in FIG. 19.

As shown in FIG. 20, the surge tank 154 is coupled to a rear part of the air cleaner 115 of the intake unit 111. Specifically, the intake unit 111 has a unit case 161 in which a case of the air cleaner 115 and an outer shell of the surge tank 154 are integrally formed. A front part of the unit case 161 is formed with a cleaner case part 162, which corresponds to the case of the air cleaner 115. Also, a rear part of the unit case 161 is formed with a tank part 163, which is a part of forming the outer shell of the surge tank 154. Also, a coupling part 164 configured to couple the cleaner case part 162 and the tank part 163 is formed between the cleaner case part 162 and the tank part 163 of the unit case 161.

As shown in FIG. 24, the cleaner case part 162 of the unit case 161 has a hollow box shape, and is formed therein with a cleaner chamber 116A. The cleaner chamber 116A is provided therein with an air filter 117 configured to filter the air. Also, a left wall part of the cleaner case part 162 is formed with an air inlet 118. In the meantime, the air intake port 118 is pictorially shown by a dashed-two dotted line. A position of the air intake port 118 can be appropriately set. Also, a front-lower part of the cleaner case part 162 is formed with an air outlet 119.

Also, the tank part 163 of the unit case 161 has a hollow box shape and is formed therein with a rectification chamber 155. Also, a right part of the tank part 163 is formed with an air inlet 156 (refer to FIG. 22 or 25A to 25C), and a lower part of the tank part 163 is formed with an air outlet 157. Also, in the unit case 161, the cleaner chamber 116A of the cleaner case part 162 and the rectification chamber 155 of the tank part 163 are separate chambers isolated from each other.

Figure 25A:
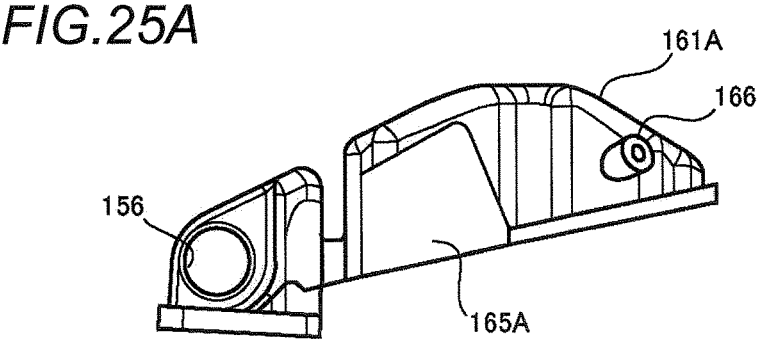
FIGS. 25A and 25B illustrate a case cover part and a case main body part of the unit case of the intake unit, which is the second illustrative embodiment of the intake device for an engine having a supercharger of the disclosure.
Figure 25B:
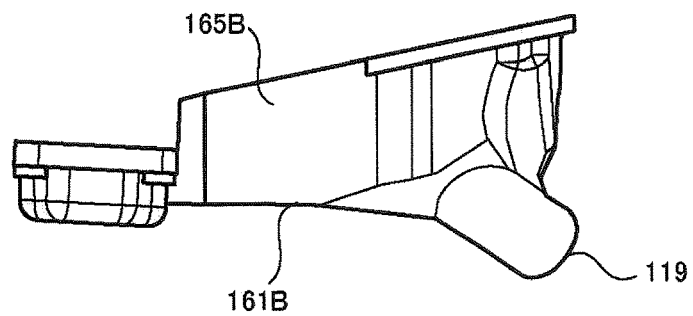

Also, the unit case 161 has a case cover part 161A forming an upper part of the unit case 161 and a case main body part 161B forming a lower part of the unit case 161. FIG. 25A depicts the case cover part 161A, and FIG. 25B depicts the case main body part 161B. As shown in FIGS. 25A and 25B, the case cover part 161A and the case main body part 161B are separate members. The case cover part 161A and the case main body part 161B are respectively formed by resin formation.

As shown in FIG. 15A, the case cover part 161A is formed with an upper part of the cleaner case part 162, an upper part of the tank part 163 and an upper part of the coupling part 164. Also, a right surface of the case cover part 161A is formed with a duct attachment surface 165A for fixing an upper part 142A of the air discharging introduction part 142 of the air discharging duct 141.

The case main body part 161B is formed with a lower part of the cleaner case part 162, a lower part of the tank part 163 and a lower part of the coupling part 164. Also, a right surface of the case main body part 161B is formed with a duct attachment surface 165B for fixing a lower part 142B of the air discharging introduction part 142 of the air discharging duct 141.

Also, in the intake unit 111, a right part of the air cleaner 115 is attached with the intercooler 131 via the air discharging introduction part 142 of the air discharging duct 141.

Figure 26A:
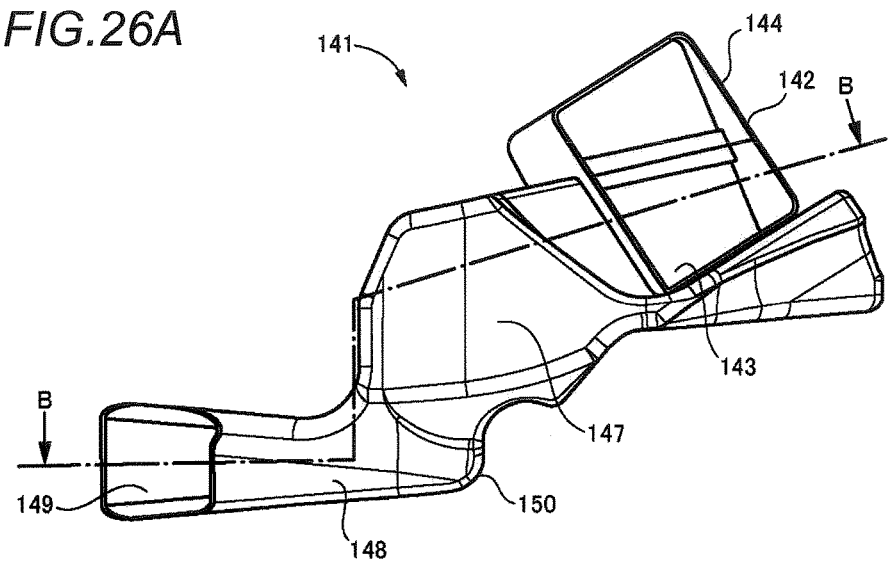
FIGS. 26A to 26C illustrate an air discharging duct of the motorcycle having a supercharger, which is provided with the intake unit of the second illustrative embodiment of the intake device for an engine having a supercharger of the disclosure.
Figure 26B:
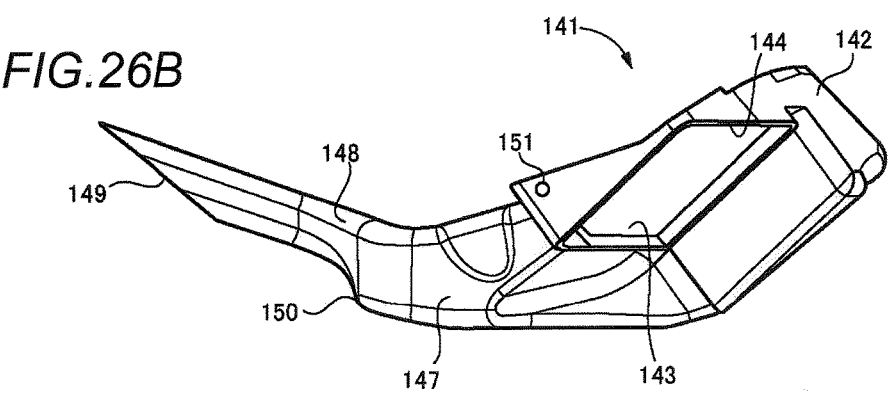
Figure 26C:
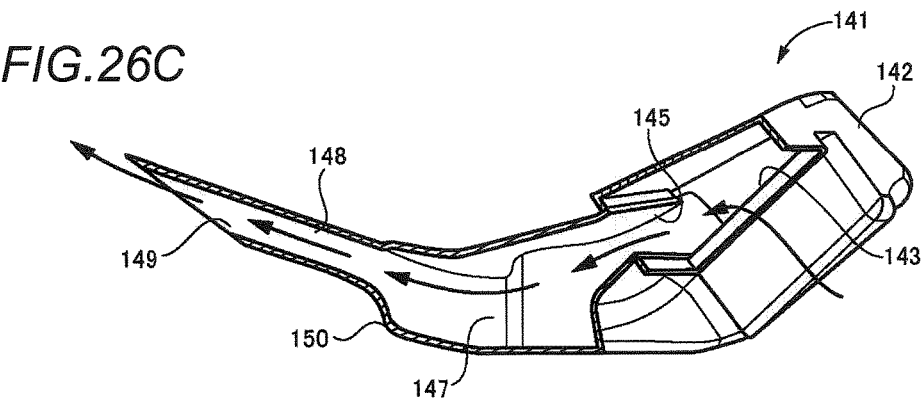

Herein, a structure of the air discharging duct 141 is described. FIG. 26A is a right side view of the air discharging duct 141, FIG. 26B is a plan view of the air discharging duct 141, and FIG. 26C is a sectional view of the air discharging duct 141 taken along an arrow B-B of FIG. 26A. As shown in FIG. 26A, the air discharging duct 14 has an air discharging introduction part 142, an expansion part 147 and an air discharging guide part 148.

The air discharging introduction part 142 is formed at a front part of the air discharging duct 141, and is configured to introduce the cooling air discharged from the intercooler 131. A front part of the air discharging introduction part 142 is formed with an air discharging introduction port 143 opening in a right-front direction. Also, a peripheral part of the air discharging introduction port 143 is formed with an intercooler support port 144 configured to support the intercooler 131. For example, the intercooler support port 144 has a rectangular shape conforming to the shape of the intercooler 131. Also, a rear part of the air discharging introduction part 142 is formed with an air discharging communication hole 145 opening rearward. The air discharging introduction part 142 is formed therein with a passage configured to flow the cooling air from the air discharging introduction port 143 to the air discharging communication hole 145.

The expansion part 147 is formed at an intermediate part of the air discharging duct 141 in the front-rear direction, i.e., between the air discharging introduction part 141 and the air discharging guide part 148. The expansion part 147 is formed therein with a passage configured to flow the cooling air from the air discharging introduction part 142 toward the air discharging guide part 148, an inlet-side of the passage is connected to the air discharging communication hole 145 and an outlet-side of the passage is connected to a passage formed in the air discharging guide part 148. Also, a flow path area of an intermediate part between the inlet end-side and the outlet end-side of the passage formed in the expansion part 147 is greater than flow path areas of the inlet end-side and the outlet end-side of the passage. That is, the passage in the expansion part 147 is wider and expanded, as compared to the front and rear passages thereof.

The air discharging guide part 148 is formed at a rear part of the air discharging duct 141, and is configured to guide the cooling air introduced by the air discharging introduction part 142 and having flowed in the expansion part 147 toward a position distant rearward from the engine 12 and close to a center of the motorcycle 1 in the vehicle width direction of the motorcycle 1. The air discharging guide part 148 is formed therein with a passage configured to flow the cooling air having flown from the expansion part 147, and a rear end portion of the air discharging guide part 148 is formed with an air discharging discharge port 149 configured to discharge the cooling air to the outside.

The cooling air guided by the air guide duct collides with the receiving surface 132C of the heat radiation part 132 of the intercooler 131 attached to the intercooler support port 144 of the air discharging introduction part 142, passes between the fins 132B of the heat radiation part 132 and flows into the air discharging introduction port 143. The cooling air introduced into the air discharging introduction port 143 is introduced from the air discharging introduction port 143 to the passage formed in the air discharging introduction part 142, passes through the air discharging communication hole 145, flows into the expansion part 147, flows in the passage formed in the air discharging guide part 148 and is then discharged from the air discharging discharge port 149 to the outside, as shown with an arrow in FIG. 26C.

Figure 27A:
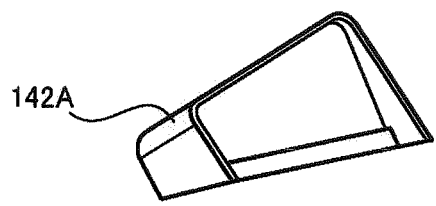
FIGS. 27A to 27C illustrate an upper part and a lower part of an air discharging introduction part of the air discharging duct in FIGS. 26A to 26C and a duct part.
Figure 27B:
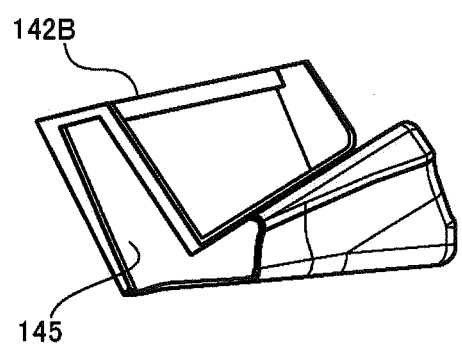
Figure 27C:
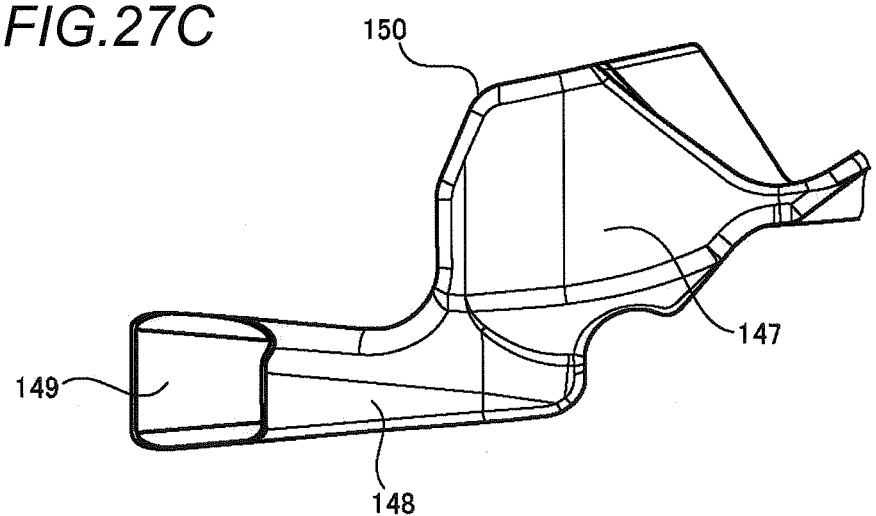

Also, in the air discharging duct 141, a coupled part of the expansion part 147 and the air discharging guide part 148 and the air discharging introduction part 142 are formed by separate members. In the below, the coupled part of the expansion part 147 and the air discharging guide part 148 is referred to as a duct part 150. Also, the air discharging introduction part 142 has an upper part 142A of forming an upper part of the air discharging introduction part 142 and a lower part 142B of forming a lower part of the air discharging introduction part 142, and the upper part 142A and the lower part 142B are formed by separate members. FIG. 27A depicts the upper part 142A of the air discharging introduction part 142, FIG. 27B depicts the lower part 142B of the air discharging introduction part 142, and FIG. 27C depicts the duct part 150.

Figure 28A:
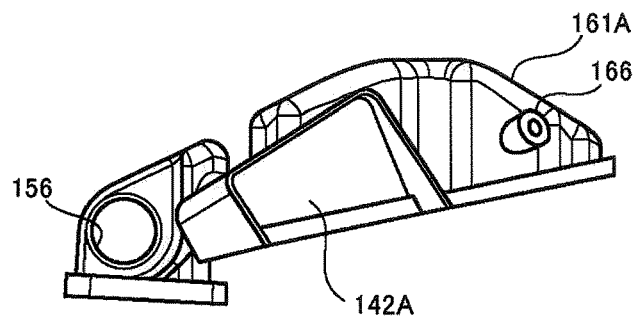
FIGS. 28A and 28B illustrate a process of assembling the intake unit, which is the second illustrative embodiment of the intake device for an engine having a supercharger of the disclosure.
Figure 28B:
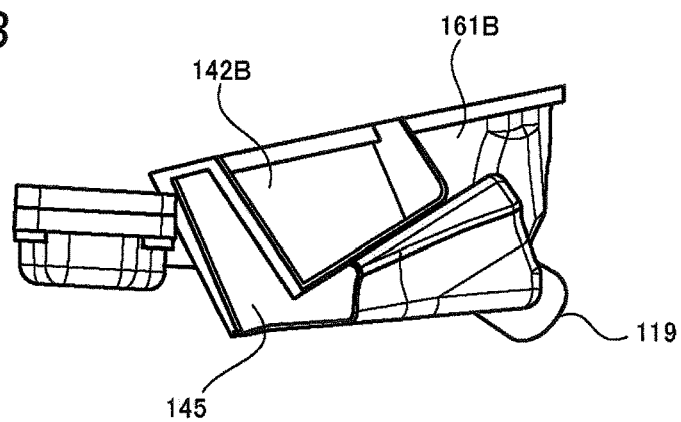
Figure 29:
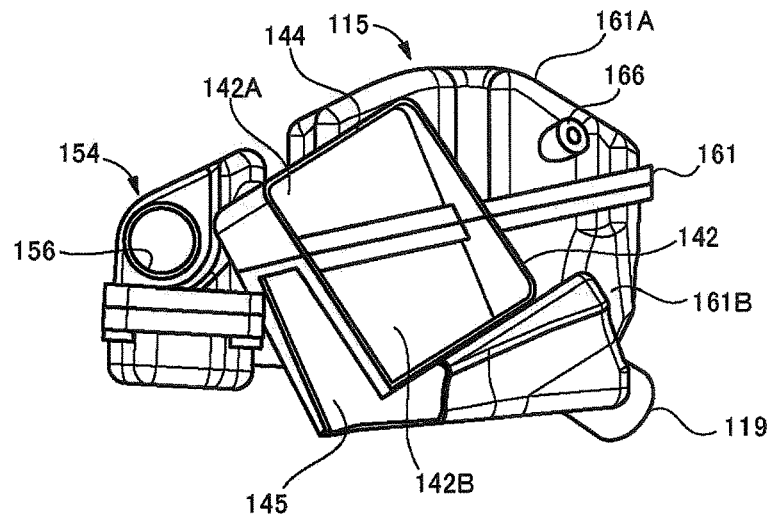
FIG. 29 illustrates a process of assembling the intake unit, which is the second illustrative embodiment of the intake device for an engine having a supercharger of the disclosure.
Figure 30:
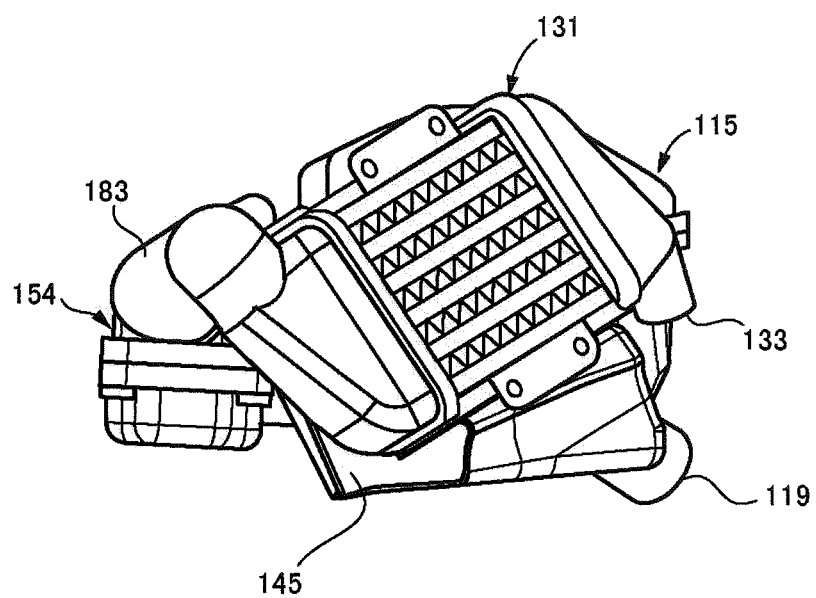
FIG. 30 illustrates a process of assembling the intake unit, which is the second illustrative embodiment of the intake device for an engine having a supercharger of the disclosure.

FIGS. 28 to 30 depict an assembling method of the intake unit 111. The intake unit 111 is assembled as follows. First, as shown in FIG. 28A, the upper part 142A of the air discharging introduction part 142 is fixed to the duct attachment surface 165A (refer to FIG. 25A) of the case cover part 161A of the case unit 161 by welding, bolting, engagement or the like. Also, as shown in FIG. 28B, the lower part 142B of the air discharging introduction part 142 is fixed to the duct attachment surface 165B (refer to FIG. 25B) of the case main body part 161B of the case unit 161 by welding, bolting, engagement or the like. Subsequently, as shown in FIG. 29, the case cover part 161A having the upper part 142A fixed thereto is attached to the case main body part 161B having the lower part 142B fixed thereto, and both are fixed using a bolt, an adhesive or the like. In this way, the case cover part 161A is attached and fixed to the case main body part 161B, so that the upper part 162A and the lower part 162B of the air discharging introduction part 142 are coupled and fixed at the same time. Then, the intercooler 131 is attached to the intercooler support port 144 of the air discharging introduction part 142, as shown in FIG. 30. Then, the intercooler 131 is fixed to the unit case 161 and the air discharging introduction part 142 by using a bolt or the like. Subsequently, the connecting pipe 183 is attached between the air outlet 134 of the intercooler 131 and the air inlet 156 of the surge tank 154. Then, the duct part 150 of the air discharging duct 141 is attached to the air discharging introduction part 142.

Figure 22:
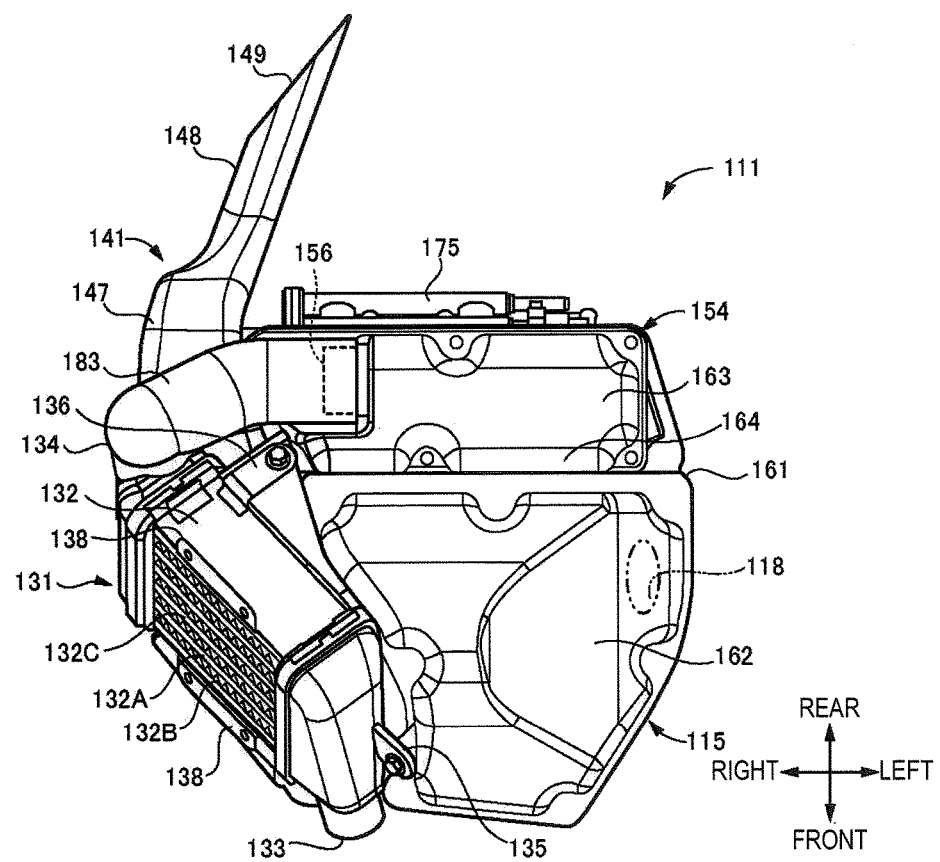
FIG. 22 is a plan view of the intake unit and the like in FIG. 19.
Figure 23:
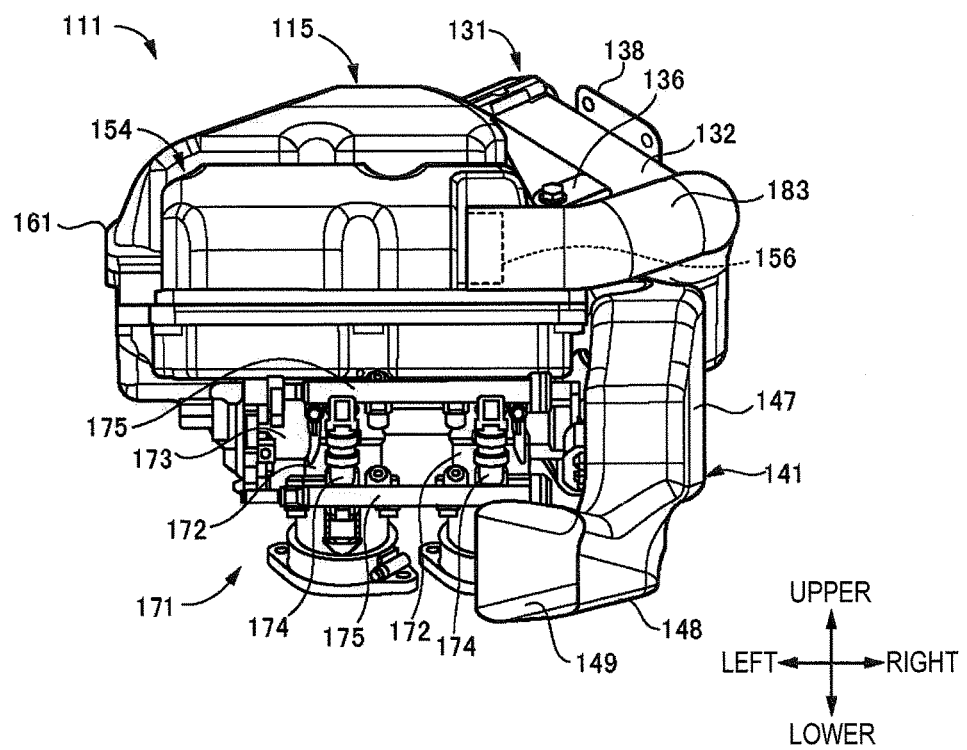
FIG. 23 is a rear view of the intake unit and the like in FIG. 19.

A structure of fixing the intercooler 131 to the unit case 161 and the air discharging introduction part 142 is described as follows, for example. That is, as shown in FIG. 22, the intercooler 131 is formed with fixing parts 135, 136, as shown in FIG. 26B, the air discharging introduction part 142 is formed with an attachment hole 151, and as shown in FIG. 25A, the upper part 161A of the unit case 161 is formed with an attachment part 166. The intercooler 131 is attached to the intercooler support port 144 by fixing the fixing part 135 to the attachment part 166 with a bolt or the like and fixing the fixing part 136 to the attachment hole 151 with a bolt or the like. The intercooler 131 is attached in this way, so that the air discharging introduction part 142 is disposed between the air cleaner 115 and the intercooler 131. In the meantime, a configuration may also be possible in which the intercooler 131 and the intercooler support port 144 are respectively formed with an engagement mechanism, the intercooler 131 is engaged to the intercooler support port 144 by the engagement mechanism and the fixing parts 135, 136 are fixed to the attachment part 166 and the attachment hole 151. Thereby, it is possible to firmly fix the intercooler 131 to the intake unit 111.

As shown in FIG. 14 or 15, the intake unit 111 is attached to the main frames 213 and is disposed above the engine 12, for example. Herein, the intake unit 111 is preferably attached to the main frames 213 at a state (FIG. 30) where the duct part 150 is not attached to the air discharging introduction part 142. That is, the intake unit 111 to which the duct part 150 has not been attached yet is attached to the main frames 213 and the duct part 150 is then attached to the air discharging introduction part 142 of the intake unit 111. Then, the duct part 150 is preferably supported to the right side frame 215 via a support member (not shown).

As shown in FIGS. 26A to 26C, the intake unit 111 is disposed between the main frames 213, as seen in a plan view of the motorcycle 1. When the intake unit 111 is attached to the main frames 213, the air cleaner 115 and the intercooler 131 are arranged side by side in the right-left direction above the engine 12, specifically, the air cleaner 115 is disposed at the left and the intercooler 131 is disposed at the right. Also, the surge tank 154 is disposed at the rear of the air cleaner 115. Also, at the state where the intake unit 111 is attached to the main frames 213, the air cleaner 115, the intercooler 131 and the surge tank 154 are disposed in a triangular shape above the engine 12 (for example, when the centers of the three components are linearly connected, a triangle is formed in the region above the engine 12).

Also, the intake unit 111 is attached to the main frames 213 and the duct part 150 is attached to the air discharging introduction part 142 of the intake unit 111, so that the air discharging duct 141 is disposed between the main frames 213. Also, the expansion part 147 of the air discharging duct 141 is disposed at the right-upper part of the engine 12, and the air discharging guide part 148 extends rearward from the right-upper part of the engine 12 along the right side frame 215 toward the center in the vehicle width direction. As a result, the air discharging discharge port 149 is disposed at a position spaced rearward from the engine 12, which is close to the center in the vehicle width direction.

As described above, according to the intake unit 111, which is an example of the intake device for an engine having a supercharger of the disclosure, the air cleaner 115, the intercooler 131, the air discharging introduction part 142 of the air discharging duct 141, and the surge tank 154 are integrated as a single unit. Therefore, it is possible to easily mount the air cleaner 115, the intercooler 131, the air discharging duct 141 and the surge tank 154 to the vehicle body of the motorcycle 1. That is, it is possible to reduce the man-hour of mounting the plurality of components of the intake system to the vehicle body. Also, since it is not necessary to separately mount the plurality of components of the intake system to different positions from different directions, it is possible to increase the mounting ability of the components of the intake system.

Also, in the intake unit 111, the unit case 161 having the cleaner case part 162 and the tank part 163 is formed, so that it is possible to simply manufacture the air cleaner 115 and the surge tank 154 and to save the manufacturing cost of the corresponding components.

Also, the air cleaner 115, the intercooler 131, the air discharging introduction part 142 of the air discharging duct 141 and the surge tank 154 are integrated, so that the air cleaner 115, the intercooler 131, the air discharging duct 141 and the surge tank 154 can be concentrated in a compact manner. Also, the air cleaner 115, the intercooler 131 and the surge tank 154 are concentrated, so that the air intake pipe 181, the air outlet pipe 182 and the connecting pipe 183 can be shortened. Therefore, it is possible to make the motorcycle 1 small by reducing the vehicle width and vehicle length of the motorcycle 1. Also, the air intake pipe 181, the air outlet pipe 182 and the connecting pipe 183 are shortened, so that it is possible to reduce a resistance against the air flowing in the pipes and to increase a response of the engine to a throttle operation or to decrease a turbo lag. Also, the air cleaner 115, the intercooler 131 and the surge tank 154 are integrated and the three components are disposed in the triangular shape above the engine 12, as seen in a plan view of the motorcycle 1, so that it is possible to increase a degree of concentrated arrangement of the three components. Therefore, it is possible to further shorten the connecting pipe 183 and to make the motorcycle 1 smaller.

Also, according to the intake unit 111, the surge tank 154 is integrally formed at the rear of the air cleaner 115 and the intercooler 131 is attached to the right part of the air cleaner 115. Therefore, when the intake unit 111 is attached to the main frames 213 and is disposed above the engine 12, it is possible to bring the supercharger 121 and the air cleaner 115 close to each other and to bring the supercharger 121 and the intercooler 131 close to each other. Thereby, it is possible to further shorten the air intake pipe 181 and the air outlet pipe 182 and to concentrate the corresponding pipes in front of the engine 12. Also, it is possible to bring the surge tank 154 close to the intake port of the engine 12, so that it is possible to shorten the intake passage between the surge tank 154 and the intake port.

Also, it is possible to simply assemble the intake unit 111 by fixing the upper part 162A of the air discharging introduction part 142 to the case cover part 161A of the unit case 161, fixing the lower part 162B of the air discharging introduction part 142 to the case main body part 161B of the unit case 161 and attaching the case cover part 161A having the upper part 162A fixed thereto to the case main body part 161B having the lower part 162B fixed thereto.

In the meantime, the air discharging guide part 148 of the air discharging duct 141 has a long pipe line for guiding the cooling air. Therefore, when the duct part 150 is attached to the air discharging introduction part 142 before mounting the intake unit 111 to the vehicle body of the motorcycle 1, the intake unit 111 becomes long in the front-rear direction, so that it may be difficult to mount the intake unit 111 to the vehicle body. For this reason, the duct part 150 is attached to the air discharging introduction part 142 after mounting the intake unit 111 to the vehicle body. Thereby, it is possible to simplify the mounting operation of the intake unit 111 to the vehicle body.

Meanwhile, in the second illustrative embodiment, the air discharging duct 141 having the shape where it extends so that it comes close to the center in the vehicle width direction as it faces rearward has been exemplified. However, the shape of the air discharging duct is not limited thereto. For example, an air discharging duct having a shape that it extends outward in the vehicle width direction as it faces rearward may be adopted or an air discharging duct having a shape that it extends rearward along the reference line S in FIG. 16 may be adopted.

Also, in the second illustrative embodiment, as shown in FIG. 17, the components of the cooling system such as the water pump 30, the cooling water flow control unit 41, the water pump inlet hose 55 and the like are disposed at the right side of the motorcycle 1, and the components of the intake system such as the air cleaner 115, the compressor unit 123 of the supercharger 121, the air intake pipe 181, the air outlet pipe 182 and the like are disposed at the left side of the motorcycle 1. However, the disclosure is not limited thereto. For example, the arrangements of the components may be reversed with respect to the right-left direction. In this case, the air discharging introduction part 142 and the intercooler 131 are attached to the left part of the air cleaner 115 (the unit case 161). Also, when the intake unit 111 is mounted to the motorcycle 1, the air cleaner 115 is positioned at the right, the intercooler 131 is positioned at the left and the air discharging duct 141 is disposed at the left-upper side of the engine 12.

Also, the disclosure can be applied to a saddle-ridden type vehicle having a general unified radiator, which is not divided into an upper radiator and a lower radiator. Also, the saddle-ridden type vehicle of the disclosure is not limited to the motorcycle, and can be applied to a variety of saddle-ridden type vehicles such as a three-wheeled vehicle, a buggy car or the like having an engine.

Also, the disclosure can be appropriately changed without departing from the gist or spirit of the inventions that can be understood from the claims and the entire specification, and an intake device for an engine having a supercharged and a saddle-ridden type vehicle, in which the change is reflected, is also included in the technical spirit of the disclosure.

What is claimed is:

1. A saddle-ridden vehicle comprising:
a vehicle body frame having a head pipe and a pair of frame members each of which is connected to the head pipe and extends rearward from the head pipe with expanding toward one side and the other side in a vehicle width direction, respectively;
an engine supported between the pair of frame members;
an air cleaner configured to purify air for fuel combustion;
a supercharger configured to compress the air purified by the air cleaner; and
an intercooler configured to cool the air compressed by the supercharger and to supply the compressed air to the engine,
wherein the supercharger is disposed in front of the engine,
wherein the air cleaner and the intercooler are disposed above the engine and the supercharger, and
wherein the air cleaner and the intercooler are arranged side by side in the vehicle width direction.

2. The saddle-ridden vehicle according to claim 1, wherein the air cleaner and the intercooler are disposed at positions overlapping with the supercharger, as seen in a plan view of the saddle-ridden vehicle.

3. The saddle-ridden vehicle according to claim 1,
wherein the supercharger comprises a turbine unit having a turbine configured to drive by an exhaust gas of the engine and a compressor unit configured to drive by power of the turbine and to compress the air, and the turbine unit and the compressor unit are arranged side by side in the vehicle width direction, and
wherein the intercooler and the compressor unit are disposed at opposite sides with respect to the vehicle width direction.

4. The saddle-ridden vehicle according to claim 1, further comprising a surge tank configured to temporarily store therein the air cooled by the intercooler and to supply the stored air to the engine,
wherein the surge tank is disposed at the rear of the air cleaner.

5. The saddle-ridden vehicle according to claim 4, wherein the air cleaner and the surge tank are disposed adjacent to each other in a front-rear direction of the saddle-ridden vehicle.

6. The saddle-ridden vehicle according to claim 1,
wherein the intercooler is disposed at one side in the vehicle width direction,
wherein the intercooler has a heat radiation part having fins configured to radiate heat of the air compressed by the supercharger by receiving exterior air, and
wherein the intercooler is disposed so that a receiving surface of the heat radiation part for receiving the exterior air is substantially parallel with one of the pair of frame members, which is positioned at the one side in the vehicle width direction.

7. The saddle-ridden vehicle according to claim 1, wherein as seen in a plan view of the saddle-ridden type vehicle, the air cleaner and the intercooler are positioned between an outermost part of one of the pair of frame members, at the one side in the vehicle width direction, and an outermost part of the other of the pair of frame members, at the other side in the vehicle width direction.

8. An intake device for an engine having a supercharger, comprising:
an air cleaner configured to purify air for fuel combustion;
an intercooler configured to cool the air purified by the air cleaner and compressed by the supercharger by cooling air; and
a surge tank configured to temporarily store therein the air cooled by the intercooler and to supply the stored air to the engine,
wherein the surge tank is coupled to the air cleaner and the intercooler is attached to the air cleaner, and
wherein the surge tank is coupled to a rear part of the air cleaner and the intercooler is attached to a side of the air cleaner.

9. The intake device according to claim 8, further comprising a unit case in which a case of the air cleaner and an outer shell of the surge tank are integrally formed.

10. The intake device according to claim 8, further comprising an air discharging duct configured to determine a discharge position or a discharge direction of the cooling air discharged from the intercooler,
wherein the air discharging duct is disposed between the air cleaner and the intercooler.

11. The intake device according to claim 10, further comprising a unit case in which a case of the air cleaner and an outer shell of the surge tank are integrally formed,
wherein the unit case has a case main body part configured to form a lower part of the unit case and a case cover part configured to form an upper part of the unit case, and the case main body part and the case cover part are formed by separate members,
wherein the air discharging duct has an air discharging introduction part configured to introduce the cooling air discharged from the intercooler and an air discharging guide part configured to guide the cooling air introduced by the air discharging introduction part in a predetermined direction, and the air discharging introduction part and the air discharging guide part are formed by separate members, and
wherein the air discharging introduction part has a lower part configured to form a lower part of the air discharging introduction part and an upper part configured to form an upper part of the air discharging introduction part, and the lower part and the upper part are formed by separate members.

12. A saddle-ridden type vehicle having the intake device according to claim 8.

13. A saddle-ridden vehicle comprising:
a vehicle body frame having a head pipe and a pair of frame members each of which is connected to the head pipe and extends rearward from the head pipe with expanding toward one side and the other side in a vehicle width direction, respectively;
an engine supported between the pair of frame members;
an air cleaner configured to purify air for fuel combustion;
a supercharger configured to compress the air purified by the air cleaner; and
an intercooler configured to cool the air compressed by the supercharger and to supply the compressed air to the engine,
wherein the supercharger is disposed in front of the engine,
wherein the air cleaner and the intercooler are disposed above the engine and the supercharger,
wherein the supercharger comprises a turbine unit having a turbine configured to drive by an exhaust gas of the engine and a compressor unit configured to drive by power of the turbine and to compress the air, and the turbine unit and the compressor unit are arranged side by side in the vehicle width direction, and wherein the intercooler and the compressor unit are disposed at opposite sides with respect to the vehicle width direction.

* * * * *